US009619134B2

(12) United States Patent
Takeda

(10) Patent No.: US 9,619,134 B2
(45) Date of Patent: *Apr. 11, 2017

(54) INFORMATION PROCESSING DEVICE, CONTROL METHOD FOR INFORMATION PROCESSING DEVICE, PROGRAM, AND INFORMATION STORAGE MEDIUM

(71) Applicant: Rakuten, Inc., Tokyo (JP)

(72) Inventor: Seiichi Takeda, Tokyo (JP)

(73) Assignee: Rakuten, Inc., Tokyo (JP)

(*) Notice: Subject to any disclaimer, the term of this patent is extended or adjusted under 35 U.S.C. 154(b) by 327 days.

This patent is subject to a terminal disclaimer.

(21) Appl. No.: 14/217,931

(22) Filed: Mar. 18, 2014

(65) Prior Publication Data

US 2014/0201663 A1 Jul. 17, 2014

Related U.S. Application Data

(62) Division of application No. 13/819,997, filed as application No. PCT/JP2012/066806 on Jun. 29, 2012.

(30) Foreign Application Priority Data

Aug. 31, 2011 (JP) ................................ 2011-190120

(51) Int. Cl.
*G06F 3/048* (2013.01)
*G06F 3/0486* (2013.01)
(Continued)

(52) U.S. Cl.
CPC ............ *G06F 3/0486* (2013.01); *G06F 3/048* (2013.01); *G06F 3/04845* (2013.01);
(Continued)

(58) Field of Classification Search
CPC combination set(s) only.
See application file for complete search history.

(56) References Cited

U.S. PATENT DOCUMENTS 5,821,933 A 10/1998 Keller et al.
9,501,519 B1* 11/2016 Joinson ............. G06F 17/30398
(Continued)

FOREIGN PATENT DOCUMENTS

CN 101782832 A 7/2010
CN 101968790 A 2/2011
(Continued)

OTHER PUBLICATIONS

European Patent Office, European Search Report issued in corresponding EP Application No. 12824892.9, dated Aug. 22, 2013.
(Continued)

*Primary Examiner* — Hien Duong
(74) *Attorney, Agent, or Firm* — Sughrue Mion, PLLC

(57) ABSTRACT

To provide an information processing device capable of ensuring not to execute processing not intended by a user in a case of stopping an ongoing operation after selecting an object (for example, in selecting again an object other than the object already selected, or the like). In a case where one of a user's designated position is included in a determination area based on the position of one of the plurality of objects displayed in a screen, an object moving unit moves the one object based on the one designated position. In a case where the object moving unit moves first and second objects, a collision determination unit determines whether or not the first and second objects have collided. A processing executing unit executes processing relevant to the first and second objects based on a result of determination by the collision determination unit.

9 Claims, 10 Drawing Sheets

(51) Int. Cl.
*G06F 9/44* (2006.01)
*G06F 3/0484* (2013.01)
*G06F 21/36* (2013.01)
*G06F 3/0488* (2013.01)

(52) U.S. Cl.
CPC ........ *G06F 3/04883* (2013.01); *G06F 9/4443* (2013.01); *G06F 21/36* (2013.01); *G06F 2203/04808* (2013.01)

(56) References Cited

U.S. PATENT DOCUMENTS

| | | |
|---|---|---|
| 2004/0150664 A1 | 8/2004 | Baudisch |
| 2007/0262964 A1 | 11/2007 | Zotov et al. |
| 2009/0122018 A1 | 5/2009 | Vymenets et al. |
| 2009/0237421 A1 | 9/2009 | Kim et al. |
| 2010/0013780 A1 | 1/2010 | Ikeda et al. |
| 2010/0090971 A1 | 4/2010 | Choi et al. |
| 2010/0138763 A1 | 6/2010 | Kim |
| 2010/0185681 A1 | 7/2010 | Han et al. |
| 2010/0188352 A1 | 7/2010 | Ikeda |
| 2010/0225443 A1 | 9/2010 | Bayram et al. |
| 2011/0022982 A1* | 1/2011 | Takaoka .............. G06F 3/04817 715/810 |
| 2011/0035691 A1 | 2/2011 | Kim et al. |
| 2011/0072388 A1 | 3/2011 | Merrell et al. |
| 2012/0098639 A1 | 4/2012 | Ijas |
| 2014/0344743 A1 | 11/2014 | Han et al. |

FOREIGN PATENT DOCUMENTS

| | | |
|---|---|---|
| CN | 101989176 A | 3/2011 |
| EP | 2 060 970 A1 | 5/2009 |
| EP | 2 284 674 A2 | 2/2011 |
| JP | 5-189484 A | 7/1993 |
| JP | 9-128208 A | 5/1997 |
| JP | 2006-99733 A | 4/2006 |
| JP | 2009-123208 A | 6/2009 |
| JP | 2011-28534 A | 2/2011 |
| WO | 03/031005 A2 | 4/2003 |

OTHER PUBLICATIONS

Written Opinion for PCT/JP2012/066806 dated Oct. 2, 2012.

* cited by examiner

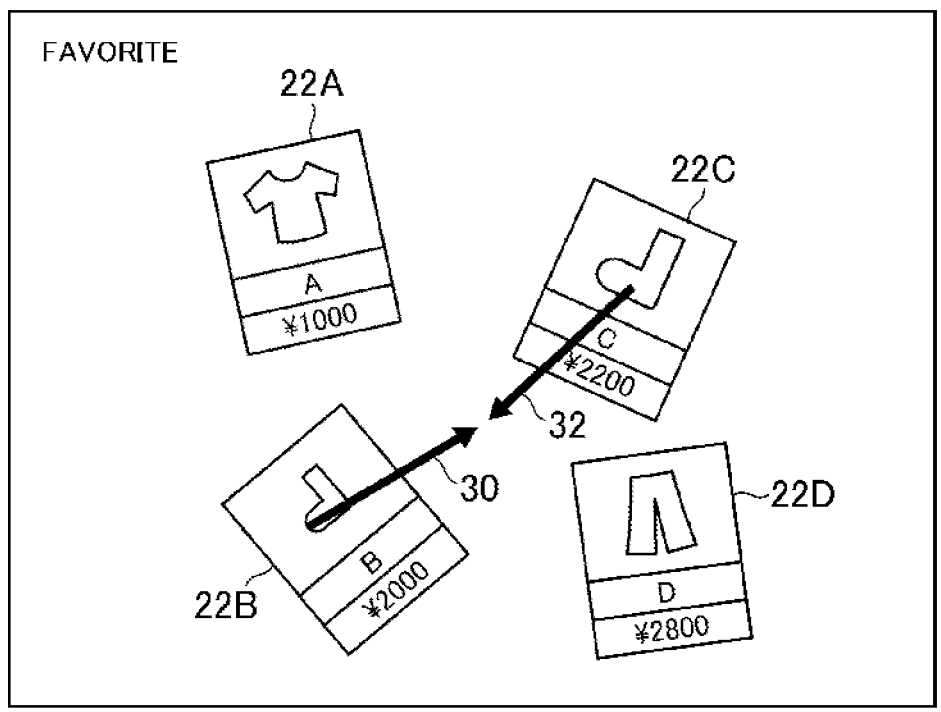

| PRODUCT ID | PRODUCT NAME | PRICE | RATING SCORE | REGISTRANTS TO FAVORITE | IMAGE | SHOPPING PAGE |
|---|---|---|---|---|---|---|
| G0100 | A | 1000 | 3.0 | 10 | --- | --- |
| G0110 | B | 2000 | 4.5 | 50 | --- | --- |
| G0120 | C | 2200 | 4.0 | 36 | --- | --- |
| G0130 | D | 2800 | 4.8 | 80 | --- | --- |

| OBJECT ID | PRODUCT ID | POSITION |
|---|---|---|
| 001 | G0100 | (xa, ya) |
| 002 | G0110 | (xb, yb) |
| 003 | G0120 | (xc, yc) |
| 004 | G0130 | (xd, yd) |

| | DESIGNATED POSITION |
|---|---|
| 1 | (x1, y1) |
| 2 | (x2, y2) |

| REFERENCE COMBINATION INFORMATION | C, F |
|---|---|
| REFERENCE DIRECTION INFORMATION | $\vec{v}$ |

| REFERENCE COMBINATION INFORMATION | C, F |
|---|---|
| REFERENCE RELATIVE SPEED INFORMATION | v |

INFORMATION PROCESSING DEVICE, CONTROL METHOD FOR INFORMATION PROCESSING DEVICE, PROGRAM, AND INFORMATION STORAGE MEDIUM

CROSS-REFERENCE TO RELATED APPLICATIONS

This is a divisional of pending U.S. application Ser. No. 13/819,997 filed Feb. 28, 2013, which is the National Stage Entry of PCT/JP2012/066806, filed on Jun. 29, 2012, which claims priority from Japanese Patent Application No. 2011-190120 filed on Aug. 31, 2011. The entire disclosures of each of which are incorporated herein in their entirety by express reference thereto.

TECHNICAL FIELD

The present invention relates to an information processing device, a control method for an information processing device, a program, and an information storage medium.

BACKGROUND ART

There has been known an information processing device for displaying a screen including a plurality of objects and executing processing relevant to two objects selected by a user from among the plurality of objects. For such an information processing device, conventionally, a drag and drop operation with respect to an object has been known as an operation for selecting two objects from among the plurality of objects and instructing execution of processing relevant to the two objects. A drag and drop operation is sequential operations of grabbing (selecting) an object, moving the object to another object (drag operation), and releasing the grabbed object (drop operation). When a grabbed object is moved onto another object and then released, processing relevant to these objects is executed.

For example, in a conventional information processing device, when a user performs a drag operation to thereby move an icon representative of a file to an icon representative of a folder and then performs a drop operation, the file is moved or copied to the folder. In addition, for example, Patent Document 1 discloses that when a user performs a drag operation to thereby move a first object onto a second object and then performs a drop operation, replacement processing is executed to replace the second object by the first object. Patent Document 1 additionally discloses a technique for readily determining a target object position where to drop an object.

CITATION LIST

Patent Literature

Patent Literature 1: JP 2006-099733 A

SUMMARY OF INVENTION

Technical Problem

However, according to a conventional drag and drop operation, there may be a case in which processing not intended by a user is executed when stopping the ongoing operation after having grabbed an object (for example, in grabbing an object other than the grabbed object, or the like). Specifically, when the drag operation is stopped halfway in moving an object onto a desired object (that is, the grabbed object is released halfway in moving onto a desired object), and the object is then positioned on another object, processing relevant to those objects may be executed. In order to prevent the above described processing not intended by a user from being executed, the user needs to move the object to a position free from any other objects before stopping the drag operation.

The present invention has been conceived in view of the above, and an object thereof is to provide an information processing device, a control method for an information processing device, a program, and an information storage medium capable of preventing processing not intended by a user from being executed when stopping the ongoing operation after selecting an object (for example, in selecting an object other than an object having been selected).

Solution to Problem

In order to achieve the above described object, an information processing device according to the present invention includes display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other in a state that the user's first designated position is included in a determination area set based on a position of the first object and the user's second designated position is included in a determination area set based on a position of the second object; and processing executing means for executing processing relevant to the first object and the second object based on a result of determination by the collision determination means.

A control method for an information processing device according to the present invention includes a display control step of displaying a screen including a plurality of objects on display means; a detection result obtaining step of obtaining a result of detection by detection means capable of detecting a plurality of a user's designated positions in the screen; an object moving step of, in a case where one of the user's designated positions is detected by the detection means and the one designated position is included in a determination area that is set based on a position of one object among the plurality of objects, moving the one object in accordance with movement of the one designated position; a collision determination step of, in a case where at least one of a first object and a second object is moved at the object moving step, determining whether or not the first object and the second object collide with each other in a state that the user's first designated position is included in a determination area set based on a position of the first object and the user's second designated position is included in a determination area set based on a position of the second object; and a processing executing step of executing processing relevant to the first object and the second object based on a result of determination at the collision determination step.

A program according to the present invention is a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other in a state that the user's first designated position is included in a determination area set based on a position of the first object and the user's second designated position is included in a determination area set based on a position of the second object; and a processing executing means for executing processing relevant to the first object and the second object based on a result of determination by the collision determination means.

A computer readable information storage medium according to the present invention is a computer readable information storage medium storing a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other in a state that the user's first designated position is included in a determination area set based on a position of the first object and the user's second designated position is included in a determination area set based on a position of the second object; and a processing executing means for executing processing relevant to the first object and the second object based on a result of determination by the collision determination means.

In an embodiment of the present invention, in a case where the user's first designated position is included in the determination area set based on the position of the first object, the user's second designated position is included in the determination area set based on the position of the second object, the at least one of the first object and the second object is moved by the object moving means, and the distance between the first designated position and the second designated position is equal to or smaller than a threshold, the collision determination means may determine the first object and the second object collide with each other.

In an embodiment of the present invention, in a case where the first object and the second object are moved by the object moving means, and a state in which the distance between the first designated position and the second designated position is equal to or smaller than the threshold lasts for a predetermined period of time, the collision determination means may determine the first object and the second object collide with each other.

In an embodiment of the present invention, the information processing device may further include threshold changing means for decreasing the threshold based on a distance between the first designated position and the second designated position, the distance being determined in a past by the collision determination means as being equal to or smaller than the threshold.

In an embodiment of the present invention, in a case where it is determined that the first object and the second object collide with each other, the processing executing means may execute the processing relevant to the first object and the second object based on a collision manner of the first object and the second object.

In an embodiment of the present invention, in the case where it is determined that the first object and the second object collide with each other, the processing executing means may select any of a plurality of kinds of processing relevant to the first object and the second object based on the collision manner of the first object and the second object, and then may execute the selected processing.

In an embodiment of the present invention, the information processing device may further include reference information storage means for storing reference combination information indicating a combination of two objects among the plurality of objects designated in advance by the user, and reference manner information indicating a manner designated in advance by the user as the collision manner of the two objects, the display control means may display the plurality of objects in mutually different display manners in the screen, the processing executing means may include combination determination means for determining whether or not a combination of the first object and the second object is identical to the combination indicated by the reference combination information in the case where it is determined that the first object and the second object collide with each other, collision manner comparing means for comparing a collision manner of the first object and the second object and the manner indicated by the reference manner information in the case where it is determined that the first object and the second object collide with each other, and authentication processing executing means for executing authentication processing based on a result of determination by the combination determination means and a result of comparison by the collision manner comparing means.

In an embodiment of the present invention, the reference manner information may include reference direction information indicating a direction designated in advance by the user, the collision manner comparing means may include direction determination means for determining whether or not an angle between a direction from one to another of the first object or the first designated position and the second object or the second designated position and the direction indicated by the reference direction information is equal to or smaller than a reference angle, and the authentication processing executing means may execute the authentication processing based on the result of determination by the combination determination means and a result of determination by the direction determination means.

In an embodiment of the present invention, the reference manner information may include reference relative speed information indicating a relative speed designated in advance by the user, the collision manner comparing means may include a relative speed determination means for determining whether or not a speed difference between a relative speed of one relative to another of the first object or the first designated position and the second object or the second designated position and the relative speed indicated by the reference relative speed information is equal to or smaller than a reference difference, and the authentication processing executing means may execute the authentication processing based on the result of determination by the combination determination means and a result of determination by the relative speed determination means.

An information processing device according to the present invention includes display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; and processing executing means for executing processing relevant to the first object and the second object based on a result of determination by the collision determination means, the processing executing means may include means for obtaining attribute information correlated to the first object and attribute information correlated to the second object stored in attribute information storage means for storing attribute information correlated to each of the plurality of objects, in a case where it is determined that the first object and the second object collide with each other, and means for displaying on the display means a comparison screen for comparing the attribute information correlated to the first object and the attribute information correlated to the second object.

A control method for an information processing device according to the present invention includes a display control step of displaying a screen including a plurality of objects on display means; a detection result obtaining step of obtaining a result of detection by detection means capable of detecting a plurality of a user's designated positions in the screen; an object moving step of, in a case where one of the user's designated positions is detected by the detection means and the one designated position is included in a determination area that is set based on a position of one object among the plurality of objects, moving the one object in accordance with movement of the one designated position; a collision determination step of, in a case where at least one of a first object and a second object is moved at the object moving step, determining whether or not the first object and the second object collide with each other; and a processing executing step of executing processing relevant to the first object and the second object based on a result of determination at the collision determination step, the processing executing step includes a step of obtaining attribute information correlated to the first object and attribute information correlated to the second object stored in attribute information storage means for storing attribute information correlated to each of the plurality of objects, in a case where it is determined that the first object and the second object collide with each other, and a step of displaying on the display means a comparison screen for comparing the attribute information correlated to the first object and the attribute information correlated to the second object.

A program according to the present invention is a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; and processing executing means for executing processing relevant to the first object and the second object based on a result of determination by the collision determination means, the processing executing means includes means for obtaining attribute information correlated to the first object and attribute information correlated to the second object stored in attribute information storage means for storing attribute information correlated to each of the plurality of objects, in a case where it is determined that the first object and the second object collide with each other, and means for displaying on the display means a comparison screen for comparing the attribute information correlated to the first object and the attribute information correlated to the second object.

A computer readable information storage medium according to the present invention is a computer readable information storage medium storing a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; and processing executing means for executing processing relevant to the first object and the second object based on a result of determination by the collision determination means, the processing executing means includes means for obtaining attribute information correlated to the first object and attribute information correlated to the second object stored in attribute information storage means for storing attribute information correlated to each of the plurality of objects, in a case where it is determined that the first object and the second object collide with each other, and means for displaying on the display means a comparison screen for comparing the attribute information correlated to the first object and the attribute information correlated to the second object.

An information processing device according to the present invention includes display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and reference information storage means for storing reference combination information indicating a combination of two objects among the plurality of objects designated in advance by the user, and reference manner information indicating a manner designated in advance by the user as the collision manner of the two objects, the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in a case where it is determined that the first object and the second object collide with each other, and an authentication processing executing means for executing authentication processing based on a result of determination by the combination determination means and a result of comparison by the collision manner comparing means, the reference manner information includes reference direction information indicating a direction designated in advance by the user, the collision manner comparing means includes a direction determination means for determining whether or not an angle between a direction from one to another of the first object and the second object and the direction indicated by the reference direction information is equal to or smaller than a reference angle, and the authentication processing executing means executes the authentication processing based on the result of determination by the combination determination means and a result of determination by the direction determination means.

A control method for an information processing device according to the present invention includes a display control step of displaying a screen including a plurality of objects on display means; a detection result obtaining step of obtaining a result of detection by detection means capable of detecting a plurality of a user's designated positions in the screen; object moving step of, in a case where one of the user's designated positions is detected by the detection means and the one designated position is included in a determination area that is set based on a position of one object among the plurality of objects, moving the one object in accordance with movement of the one designated position; a collision determination step of, in a case where at least one of a first object and a second object is moved at the object moving step, determining whether or not the first object and the second object collide with each other; a processing executing step of executing processing relevant to the first object and the second object based on a result of determination at the collision determination step; and a step of obtaining at least a part of content stored in reference information storage means for storing reference combination information indicating a combination of two objects among the plurality of objects designated in advance by the user, and reference manner information indicating a manner designated in advance by the user as the collision manner of the two objects, wherein at the display control step, the plurality of objects are displayed in mutually different display manners in the screen, the processing executing step includes a combination determination step of determining whether or not a combination of the first object and the second object is identical to the combination indicated by the reference combination information in a case where it is determined that the first object and the second object collide with each other, a collision manner comparing step of comparing a collision manner of the first object and the second object and the manner indicated by the reference manner information in a case where it is determined that the first object and the second object collide with each other, and an authentication processing executing step of executing authentication processing based on a result of determination at the combination determination step and a result of comparison at the collision manner comparing step, the reference manner information includes reference direction information indicating a direction designated in advance by the user, the collision manner comparing step includes a direction determination step of determining whether or not an angle between a direction from one to another of the first object and the second object and the direction indicated by the reference direction information is equal to or smaller than a reference angle, and at the authentication processing executing step, the authentication processing is executed based on the result of determination at the combination determination step and a result of determination at the direction determination step.

A program according to the present invention is a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and means for obtaining at least a part of content stored in a reference information storage means for storing reference combination information indicating a combination of two objects among the plurality of objects designated in advance by the user, and reference manner information indicating a manner designated in advance by the user as the collision manner of the two objects, wherein the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in a case where it is determined that the first object and the second object collide with each other, and authentication processing executing means for executing authentication processing based on a result of determination by the combination determination means and a result of comparison by the collision manner comparing means, the reference manner information includes reference direction information indicating a direction designated in advance by the user, the collision manner comparing means includes direction determination means for determining whether or not an angle between a direction from one to another of the first object and the second object and the direction indicated by the reference direction information is equal to or smaller than a reference angle, and the authentication processing executing means executes the authentication processing based on the result of determination by the combination determination means and a result of determination by the direction determination means.

A computer readable information storage medium according to the present invention is a computer readable information storage medium storing a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and means for obtaining at least a part of content stored in reference information storage means for storing reference combination information indicating a combination of two objects among the plurality of objects designated in advance by the user, and reference manner information indicating a manner designated in advance by the user as the collision manner of the two objects, wherein the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in the case where it is determined that the first object and the second object collide with each other, and authentication processing executing means for executing authentication processing based on a result of determination by the combination determination means and a result of comparison by the collision manner comparing means, the reference manner information includes reference direction information indicating a direction designated in advance by the user, the collision manner comparing means includes direction determination means for determining whether or not an angle between a direction from one to another of the first object and the second object and the direction indicated by the reference direction information is equal to or smaller than a reference angle, and the authentication processing executing means executes the authentication processing based on the result of determination by the combination determination means and a result of determination by the direction determination means.

An information processing device according to the present invention includes display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and reference information storage means for storing reference combination information indicating a combination of two objects among the plurality of objects designated in advance by the user, and reference manner information indicating a manner designated in advance by the user as the collision manner of the two objects, wherein the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in the case where it is determined that the first object and the second object collide with each other, and authentication processing executing means for executing authentication processing based on a result of determination by the combination determination means and a result of comparison by the collision manner comparing means, the reference manner information includes reference relative speed information indicating a relative speed designated in advance by the user, the collision manner comparing means includes relative speed determination means for determining whether or not a speed difference between a relative speed of one of the first object and the second object relative to another of the first object and the second object and the relative speed indicated by the reference relative speed information is equal to or smaller than a reference difference, and the authentication processing executing means executes the authentication processing based on the result of determination by the combination determination means and a result of determination by the relative speed determination means.

A control method for an information processing device according to the present invention includes a display control step of displaying a screen including a plurality of objects on display means; a detection result obtaining step of obtaining a result of detection by detection means capable of detecting a plurality of a user's designated positions in the screen; an object moving step of, in a case where one of the user's designated positions is detected by the detection means and the one designated position is included in a determination area that is set based on a position of one object among the plurality of objects, moving the one object in accordance with movement of the one designated position; a collision determination step of, in a case where at least one of a first object and a second object is moved at the object moving step, determining whether or not the first object and the second object collide with each other; and a processing executing step of executing processing relevant to the first object and the second object based on a result of determination at the collision determination step; and a step of obtaining at least a part of content stored in reference information storage means for storing reference combination information indicating a combination of two objects among the plurality of objects designated in advance by the user, and reference manner information indicating a manner designated in advance by the user as the collision manner of the two objects, wherein at the display control step, the plurality of objects are displayed in mutually different display manners in the screen, the processing executing step includes a combination determination step of determining whether or not a combination of the first object and the second object is identical to the combination indicated by the reference combination information in a case where it is determined that the first object and the second object collide with each other, a collision manner comparing step of comparing a collision manner of the first object and the second object and the manner indicated by the reference manner information in the case where it is determined that the first object and the second object collide with each other, and an authentication processing executing step of executing authentication processing based on a result of determination at the combination determination step and a result of comparison at the collision manner comparing step, the reference manner information includes reference relative speed information indicating a relative speed designated in advance by the user, the collision manner comparing step includes a relative speed determining step for determining whether or not a speed difference between a relative speed of one of the first object and the second object relative to another of the first object and the second object and the relative speed indicated by the reference relative speed information is equal to or smaller than a reference difference in the case where it is determined that the first object and the second object collide with each other, and at the authentication processing executing step, the authentication processing is executed based on the result of determination at the combination determination step and a result of determination at the relative speed determination step.

A program according to the present invention is a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and means for obtaining at least a part of content stored in reference information storage means for storing reference combination information indicating a combination of two objects among the plurality of objects designated in advance by the user, and reference manner information indicating a manner designated in advance by the user as the collision manner of the two objects, wherein the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in the case where it is determined that the first object and the second object collide with each other, and authentication processing executing means for executing authentication processing based on a result of determination by the combination determination means and a result of comparison by the collision manner comparing means, the reference manner information includes reference relative speed information indicating a relative speed designated in advance by the user, the collision manner comparing means includes a relative speed determination means for determining whether or not a speed difference between a relative speed of one of the first object and the second object relative to another of the first object and the second object and the relative speed indicated by the reference relative speed information is equal to or smaller than a reference difference in the case where it is determined that the first object and the second object collide with each other, and the authentication processing executing means executes the authentication processing based on the result of determination by the combination determination means and a result of determination by the relative speed determination means.

A computer readable information storage medium according to the present invention is a computer readable information storage medium storing a program for causing a computer to function as display control means for displaying a screen including a plurality of objects on display means; detection result obtaining means for obtaining a result of detection by detection means capable of detecting a plurality of a user's designated positions in the screen; object moving means for, in a case where one of the user's designated positions is detected by the detection means and the one designated position is included in a determination area that is set based on a position of one object among the plurality of objects, moving the one object in accordance with movement of the one designated position; collision determination means for, in a case where at least one of a first object and a second object is moved by the object moving means, determining whether or not the first object and the second object collide with each other; processing executing means for executing processing relevant to the first object and the second object based on a result of determination by the collision determination means; and means for obtaining at least a part of content stored in reference information storage means for storing reference combination information indicating a combination of two objects among the plurality of objects designated in advance by the user, and reference manner information indicating a manner designated in advance by the user as the collision manner of the two objects, wherein the display control means displays the plurality of objects in mutually different display manners in the screen, the processing executing means includes combination determination means for determining whether or not a combination of the first object and the second object is identical to the combination indicated by the reference combination information in a case where it is determined that the first object and the second object collide with each other, collision manner comparing means for comparing a collision manner of the first object and the second object and the manner indicated by the reference manner information in the case where it is determined that the first object and the second object collide with each other, and authentication processing executing means for executing authentication processing based on a result of determination by the combination determination means and a result of comparison by the collision manner comparing means, the reference manner information includes reference relative speed information indicating a relative speed designated in advance by the user, the collision manner comparing means includes a relative speed determination means for determining whether or not a speed difference between a relative speed of one of the first object and the second object relative to another of the first object and the second object and the relative speed indicated by the reference relative speed information is equal to or smaller than a reference difference in the case where it is determined that the first object and the second object collide with each other, and the authentication processing executing means executes the authentication processing based on the result of determination by the combination determination means and a result of determination by the relative speed determination means.

Advantageous Effects of Invention

According to the present invention, it is possible to ensure not to execute processing not intended by a user when stopping the ongoing operation after selecting an object (for example, in selecting an object other than the object already selected, or the like).

BRIEF DESCRIPTION OF DRAWINGS

FIG. 4 is a diagram explaining an operation for comparing two products;
FIG. 5 shows one example of a comparison screen.

DESCRIPTION OF EMBODIMENTS

In the following, examples of embodiments of the present invention will be described in detail with reference to the accompanying drawings.

First Embodiment

Figure 1:
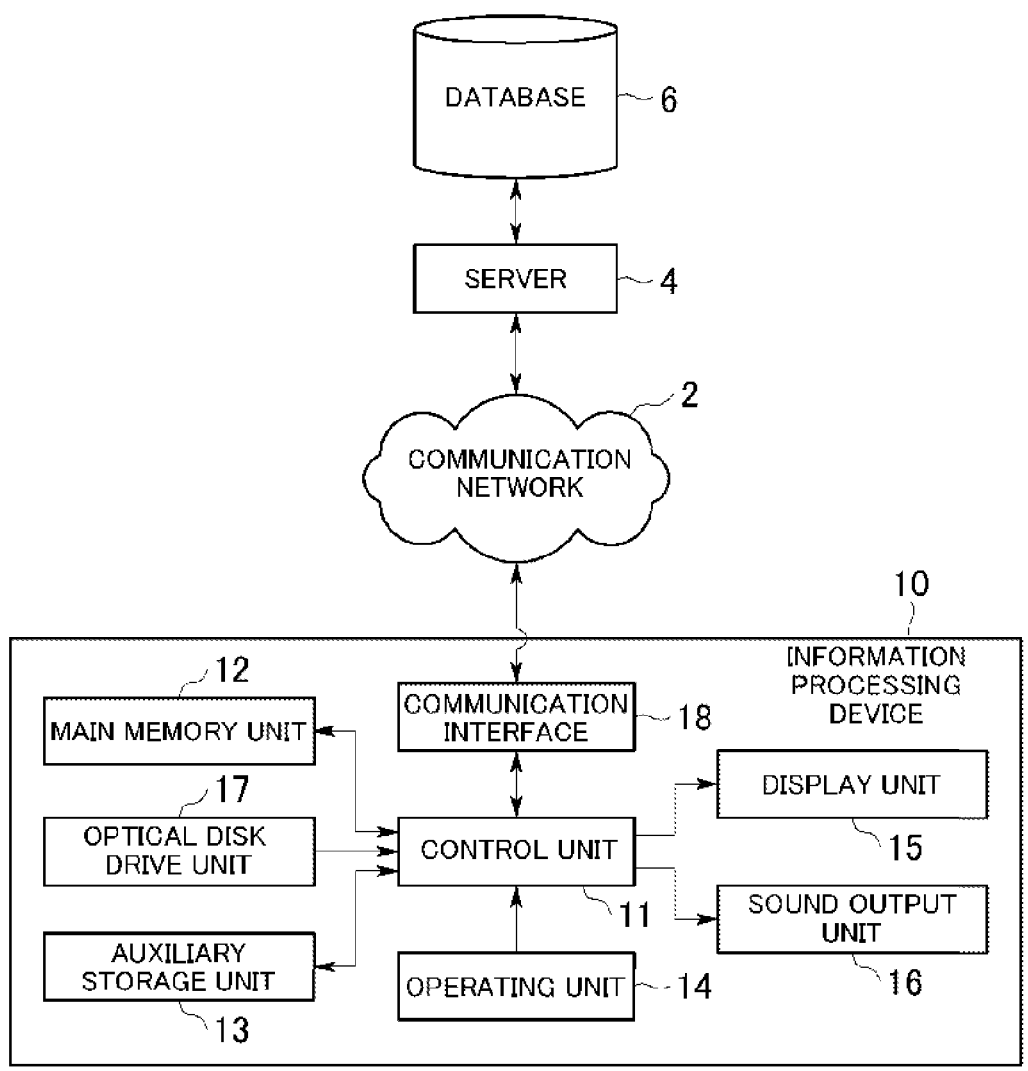
FIG. 1 shows one example of a hardware structure of an information processing device according to an embodiment of the present invention.

Initially, an information processing device according to a first embodiment of the present invention will be described. The information processing device according to the first embodiment is implemented using, for example, a portable phone, a portable information terminal, a personal computer, a game device, or the like. FIG. 1 shows one example of a hardware structure of an information processing device 10 in this embodiment. As shown in FIG. 1, the information processing device 10 includes a control unit 11, a main memory unit 12, an auxiliary storage unit 13, an operating unit 14, a display unit 15, a sound output unit 16, an optical disk drive unit 17, and a communication interface 18.

The control unit 11 includes, for example, one or more CPUs, and executes information processing according to an operation system or a program stored in the auxiliary storage unit 13. The main storage unit 12 is a RAM, for example, while the auxiliary storage unit 13 is a hard disk or a solid state drive, for example.

The operating unit 14 is used for user operation. In this embodiment, a designation unit for use by a user to designate a position in a screen displayed on the display unit 15 is provided as the operating unit. That is, a pointing device, such as, for example, a touch panel, a mouse, a stick, or the like, is provided as the operating unit. Note that the following description is based on an assumption that the information processing device 10 has a touch panel provided on the display unit 15.

The touch panel provided to the information processing device 10 is a general touch panel, and capable of detecting one or more positions touched by a user. As a touch panel, a touch panel employing a static capacitance method, for example, is used. With the touch panel employing the static capacitance method, one or more positions touched by a user is/are detected, based on change in the charge that is caused upon a user's touching the surface of the touch panel. The touch panel supplies information indicative of one or more positions touched by the user. The control unit 11 obtains the one or more positions touched by the user, based on the information supplied from the touch panel.

The display unit 15 is a liquid crystal display, or the like, for example, and the sound output unit 16 is a speaker or the like, for example. The optical disk drive unit 17 reads a program and/or data stored in an optical disk (an information storage medium).

Note that, for example, a program and data is supplied to the auxiliary storage unit 13 via an optical disk. That is, an optical disk with a program and data recorded thereon is inserted in the optical disk drive unit 17, and the program and/or data recorded on the optical disk is read by the optical disk drive unit 17 and then stored in the auxiliary storage unit 13. Note that the optical disk drive unit 17 is not an essential structural element. A structural element for reading a program or data stored in an information storage medium (for example, a memory card) other than an optical disk may be included, instead of the optical disk drive unit 17, so that a program and/or data may be supplied to the auxiliary storage unit 13 via an information storage medium other than an optical disk. Alternatively, a program and/or data may be supplied to the auxiliary storage unit 13 via a communication network 2 including, for example, the Internet or the like.

The communication interface 18 is an interface for connecting the information processing device 10 to the communication network 2. The information processing device 10 can access the server 4 via the communication network 2.

The server 4 executes processing based on a processing request received from the information processing device 10. For example, a demon program is activated in the server 4, and upon receipt of a processing request from the information processing device 10, the server 4 accesses the database 6, when necessary, and sends a processing result in response to the processing request to the information processing device 10. The database 6 may be ensured in a server computer different from the server 4 or in the server 4.

In the above described information processing device 10, processing that is relevant to two objects selected by a user from among a plurality of objects displayed in a screen is executed.

In the following, the above described technique will be described, referring to a case as an example in which an electronic commercial site where a user can buy a product via the communication network 2 is provided by the server 4, and an application program for using the electronic commercial site is executed in the information processing device 10.

Figure 2:
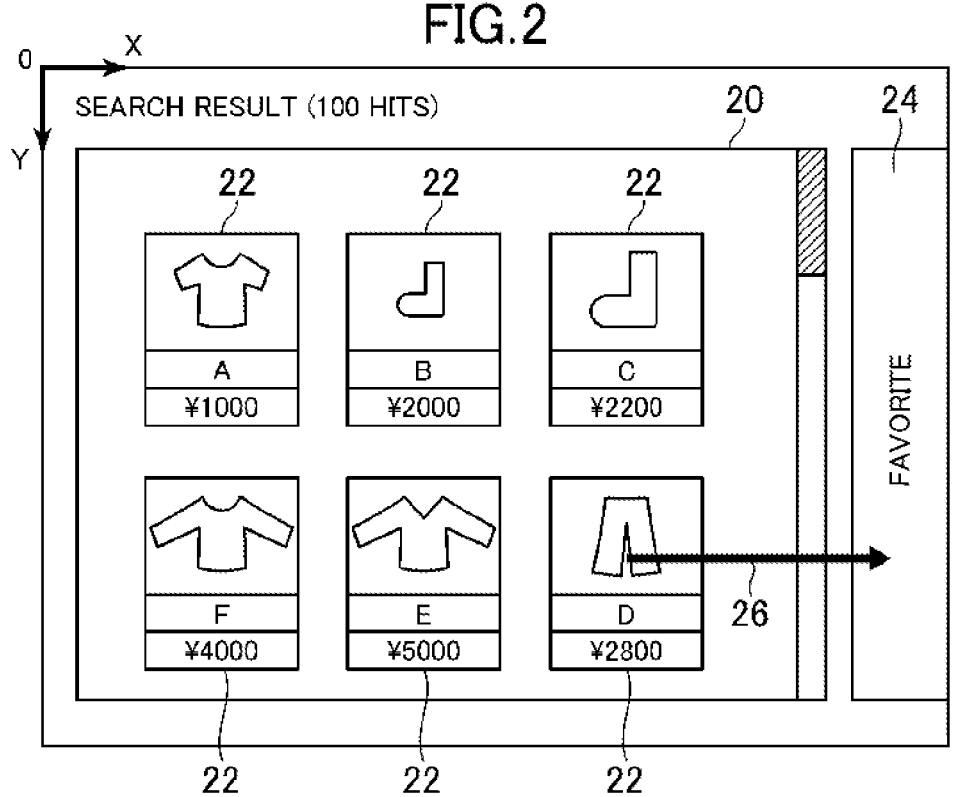
FIG. 2 shows one example of a search result screen.
Figure 3:
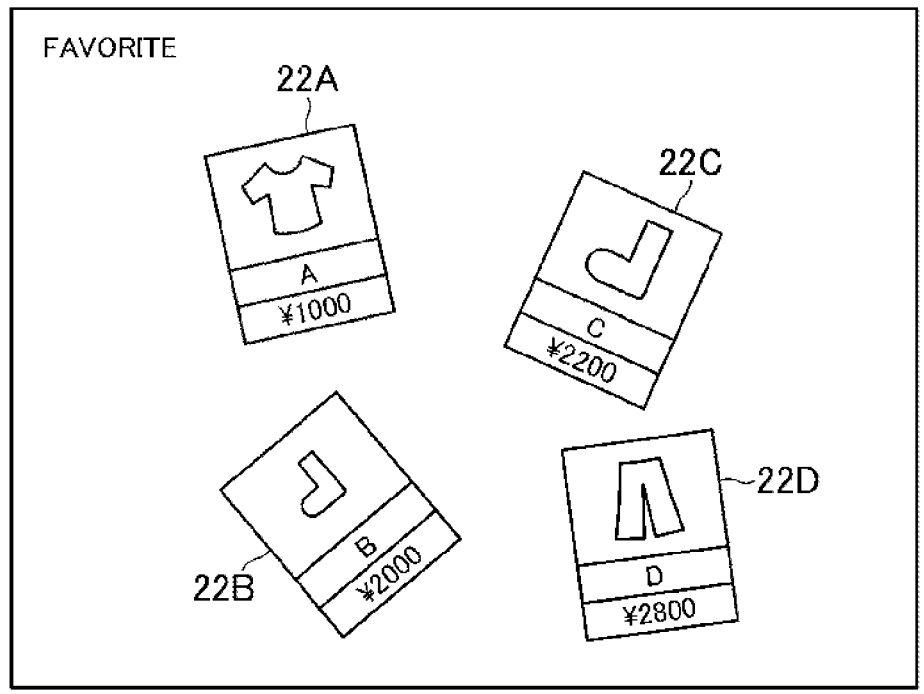
FIG. 3 shows one example of a favorite screen.

Initially, the above-described application program will be described. FIGS. 2 to 4 show one example of a screen displayed on the display unit 15 of the information processing device 10 when the above-described application program is executed.

FIG. 2 shows one example of a search result screen. The search result screen is a screen showing a list of products that satisfy a search condition set based on an input by a user in a search screen (not shown).

The search result screen is displayed through data exchange between the information processing device 10 (the above-described application program) and the server 4. That is, the above-described application program sends to the server 4 a search condition that is set based on an input by a user in the search screen. Having received the search condition, the server 4 accesses the database 6 to obtain a list of products satisfying the search condition. Then, the server 4 sends the obtained product list to the information processing device 10. The search result screen showing the product list sent from the server 4 is displayed in the information processing device 10.

As shown in FIG. 2, the search result screen includes a list area 20. In the list area 20, a list of products satisfying the search condition is displayed. Specifically, a product image 22 of each product satisfying the search condition is displayed in the list area 20. The product image 22 includes a thumb nail image of the product, and the name and price of the product are attached to the product image 22.

The search result screen includes a favorite area 24. The favorite area 24 is used for registration of a product as a favorite among the products displayed in the list area 20.

In the following, an operation for registering a product as a favorite will be described. Assume a case in which a user registers a product "D" as a favorite. In this case, the user touches the touch panel with his/her finger so as to point out the product image 22 of the product "D", then slides the finger to the favorite area 24 on the touch panel, as indicated by the arrow 26. In response to such an operation, the product image 22 of the produce "D" moves to the favorite area 24 in accordance with the movement of the finger, and the product "D" is resultantly registered as a favorite. Upon new registration of a product as a favorite, a favorite screen showing a list of products registered as favorites is displayed.

FIG. 3 shows one example of the favorite screen. In the favorite screen, product images 22 of the products registered as favorites are displayed. FIG. 3 shows one example of the favorite screen with the products "A", "B", "C", and "D" registered as favorite products. In the favorite screen shown in FIG. 3, the product images 22A, 22B, 22C, and 22D of the products "A", "B", "C", and "D" are displayed. In the favorite screen, the initial display position and orientation of the product image 22 are determined at random. As a result, the product images 22 are displayed scattered, like the product images 22A to 22D shown in FIG. 3.

This favorite screen as well is displayed through data exchange between the information processing device 10 (the above-described application program) and the server 4. That is, when the product image 22 of any product moves to the favorite area 24 in the search result screen, the above-described application program sends the product ID of the product, together with the user ID, to the server 4.

A table showing a product registered by a user as a favorite is stored in the database 6, and the server 4 updates the table, based on the above-described user ID and product ID received from the information processing device 10. Further, the server 4 obtains information on a product registered by a user as a favorite from the database 6, and sends the obtained information to the information processing device 10. In the information processing device 10, the information sent from the server 4 is stored in the auxiliary storage unit 13 (see FIG. 7 to be described later), and the favorite screen is displayed based on the information.

In the favorite screen, a user can select and compare two products with each other. In the following, an operation for comparing two products will be described. FIG. 4 is a diagram explaining this operation. Assume a case here in which the products "B" and "C" are compared with each other.

In comparing the products "B" and "C", a user performs, for example, a "pinching operation" to collide the product image 22B of the produce "B" against the produce image 22C of the produce "C". That is, the user puts one finger (for example, the thumb) of his/her one hand (for example, the right hand) on the touch panel so as to point out the product image 22B of the produce "B", and another finger (for example, the index finger) on the touch panel so as to point out the product image 22C of the produce "C". Thereafter, the user slides these fingers so as to get closer to each other on the touch panel. With such an operation, the product image 22B of the produce "B" and the product image 22C of the produce "C" move getting closer to each other, as indicated by the arrows 30, 32, in accordance with the movement of the fingers.

Then, when it is determined that the product image 22B of the produce "B" has collided against the product image 22C of the produce "C", a comparison screen for comparing the products "B" and "C" is displayed. FIG. 5 shows one example of the comparison screen in this case. In the comparison screen in this case, a comparison table 40 showing various information on the products "B" and "C" is displayed.

A purchaser of a product can rate the product with the full score of five points, for example, in the electronic commercial site. That is, the average of the ratings registered by purchasers of the product is displayed in the "rating score" section in the comparison table 40. When a product is registered as a favorite in the above-described search result screen, the server 4 is notified of the fact that the product is registered as a favorite, and the number of users having registered the product as a favorite is stored in the database 6. The "favorite" section in the table 40 shows the number of users having registered the product as a favorite.

In the comparison screen, a link button 42 for jumping to a shopping screen for buying a respective product is displayed. Selection of the link button 42 causes a shopping screen (not shown) for buying a concerned product to appear. Further, a close button 44 is also displayed in the comparison screen. Selection of the close button 44 causes the comparison screen to close and the favorite screen to appear again.

When a user points out to thereby select two product images 22 from among a plurality of product images 22 displayed in the favorite screen and moves the two fingers to thereby move the two product images 22 so as to collide, a comparison screen for the two products is displayed. That is, according to the information processing device 10, a user can instruct the information processing device 10 to display a comparison screen for two products through an intuitive operation of colliding two product images 22.

Note that a drag and drop operation may be employed as an operation for instructing the information processing device 10 to display a comparison screen for two products. That is, it is feasible to display, when a user performs a drag operation to thereby move one product image 22 onto another product image 22 and then a drop operation with the products images 22 placed one on the other, a comparison screen for two products of those product images 22.

With the above described drag and drop operation employed, however, there may be a case in which, when intending to move, through a drag operation, one product image 22 onto his/her desired product image 22 among a plurality of densely placed product images 22 and then perform a drop operation, a user may perform a drop operation with the one product image 22 erroneously placed on a product image 22 other than his/her desired product image 22. In such a case, a comparison image for two products not intended by the user is displayed.

On the contrary, according to the information processing device 10 in this embodiment, a user initially selects both of the product images 22 of two products for comparison, and then the user moves the product images 22 so as to collide. As a result, a comparison screen for the two products is displayed. With the above, the above described inconvenience is unlikely caused. That is, even if a product image 22 other than a desired product image 22 is selected, unless the product image 22 is caused to collide against another product image 22, a comparison screen for these products is not displayed. In this case, the user simply detaches his/her finger from the touch panel, and selects again a product image 22. As described above, according to the information processing device 10 in this embodiment, a comparison screen for two products not intended by a user is unlikely displayed.

Further, with the above described drag and drop operation employed, when a user stops the ongoing drag operation halfway in moving one product image 22, which then happens to be placed on another product image 22, a comparison screen for these products is displayed. That is, a comparison screen for two products not intended by the user is displayed. To address the above, the user needs to move the one product image 22 to a position not overlapping another product image 22 before stopping the drag operation.

On the contrary, according to the information processing device 10 in the first embodiment, the above described inconvenience is not caused. That is, even when a user detaches his/her finger from the touch panel to select a different product image 22 after selecting a product image 22 other than a desired product image 22, the user does not need to particularly care whether or not the selected product image 22 happens to be positioned on another product image 22. This is because a comparison screen for products is not displayed unless the product images 22 selected by the user collide even though the selected product image 22 is placed on another product image 22.

Figures 6, 7, 8, 9:
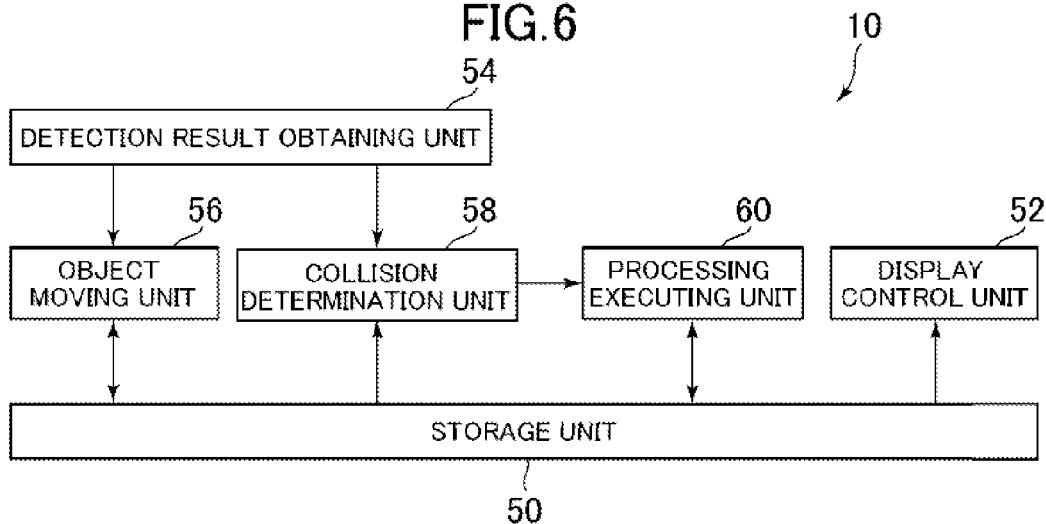
FIG. 6 is a functional block diagram of the information processing device.
FIG. 7 shows one example of a favorite table.
FIG. 8 shows one example of an object table.
FIG. 9 shows one example of designated position data.

In the following, a structure for implementing the above described favorite screen (user interface) will be described. FIG. 6 is a functional block diagram showing only a functional block relevant to collision determination processing in the favorite screen among those implemented by the information processing device 10 in this embodiment. As shown in FIG. 6, the information processing device 10 includes a storage unit 50, a display control unit 52, a detection result obtaining unit 54, an object moving unit 56, a collision determination unit 58, and a processing executing unit 60.

For example, the storage unit 50 is implemented using the main storage unit 12 and the auxiliary storage unit 13. The display control unit 52, the detection result obtaining unit 54, the object moving unit 56, the collision determination unit 58, and the processing executing unit 60 are implemented by the control unit 11. That is, the control unit 11 executes processing according to a program, thereby functioning as these functional blocks.

The storage unit 50 will be described. The storage unit 50 stores various data. FIGS. 7 to 9 show one example of data stored in the storage unit 50.

FIG. 7 shows one example of a favorite table. The favorite table is a table showing information on a product registered as a favorite. As described above, in displaying the favorite screen, information on a product registered by a user as a favorite is obtained from the server 4 (database 6). The obtained information is registered in the favorite table.

The favorite table shown in FIG. 7 includes "product ID", "product name", "price", "rating score", "number of registrants to favorite", "image", and "shopping page" fields. In the "product ID" field, identification information (product ID) uniquely identifying a product is registered. In the "product name" and "price" fields, the name and price of a product are respectively registered. In the "rating score" field, the average of the rating scores made by purchasers of the product is registered. In the "number of registrants to favorite" field, the number of users having registered the product as a favorite is registered. In the "image" field, link information (URL) to a normal image and a thumb nail image of the product is registered. In the "shopping page" field, link information (URL) to a shopping page (shopping screen) for the product is registered.

FIG. 8 shows one example of the object table. The object table is a table for managing an object (product image 22) displayed in the favorite screen. The object table includes "object ID", "product ID", and "position" fields. In the "object ID" field, identification information (object ID) uniquely identifying an object (product image 22) is registered. In the "product ID" field, the product ID of a product correlated to an object (product image 22) is registered. For example, for the product image 22 of the product "A", the product ID of the product "A" is registered in the "product ID" field. In the "position" field, a display position of an object (product image 22) is registered. For example, the screen coordinates of a representative position (for example, the center position) of an object (product image 22) is registered. Note that a screen coordinate system is a coordinate system having the origin defined at the upper left corner of a screen, the X axis being positive in the rightward direction, and the Y axis being positive in the downward direction.

In the following, the display control unit 52 will be described. The display control unit 52 displays a screen including a plurality of objects on the display unit 15. In this embodiment, the display control unit 52 displays a favorite screen on the display unit 15. That is, in this embodiment, the favorite screen corresponds to the above-described "screen", and a plurality of product images 22 displayed in the favorite screen correspond to the above-described "plurality of objects".

In the following, the detection result obtaining unit 54 will be described. The detection result obtaining unit 54 obtains a result of detection by a detection unit capable of detecting two or more positions designated by a user in a screen. For example, the pointing device corresponds to the "detection unit". In this embodiment, the touch panel corresponds to the "detection unit", and the detection result obtaining unit 54 obtains a position designated by a user (a user's designated position) and detected by the touch panel. For example, when a user designates two positions (a first designated position and a second designated position) in a screen, the touch panel detects the first designated position and the second designated position. Then, the detection result obtaining unit 54 obtains the first designated position and the second designated position detected by the touch panel. In this case, the detection result obtaining unit 54 obtains designated position data, such as is shown in FIG. 9, for example. Note that a user's designated position is expressed using the coordinates of the screen coordinate system.

In the following, the object moving unit 56 will be described. While one of a user's designated positions is detected by the detection unit, the object moving unit 56 determines whether or not the one designated position is included in a determination area that is set based on the position of one object among the plurality of objects. When the one designated position is included in the determination area set based on the position of one object, the object moving unit 56 moves the one object in accordance with movement of the one designated position.

For example, when a user's first designated position is detected by the detection unit, the object moving unit 56 determines whether or not the first designated position is included in the determination area that is set based on the display position of any object among a plurality of objects. Further, when the user's second designation position is detected by the detection unit, besides the first designated position, the object moving unit 56 determines whether or not the second designated position is included in the determination area that is set based on the display position of another object among the plurality of objects.

Below, the "determination area" will be described. A determination area is an area that is set for determining whether or not a user is pointing out an object. A determination area is set based on the display position of an object, and moves in accordance with movement of the object. For example, an area where an object is displayed is set as a determination area. The determination area may not necessarily coincide with the area where the object is displayed. For example, an area including the entire area where an object is displayed and also being larger than the area where the object is displayed may be set as a determination area. Further, for example, for an object in a relatively complicated shape, a determination area having a relatively simpler shape may be set.

Figure 10:
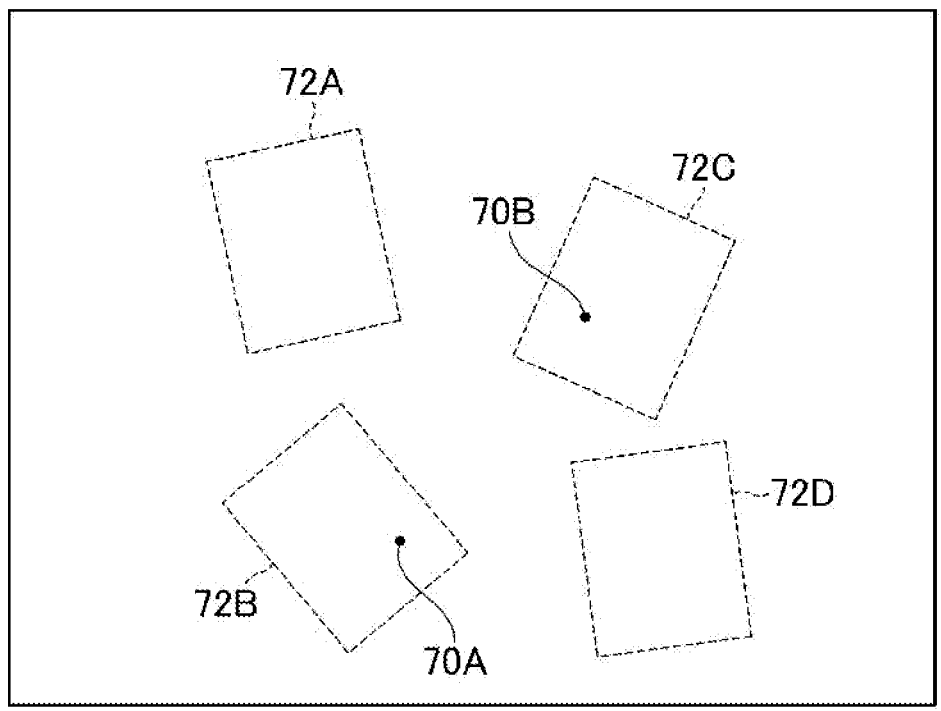
FIG. 10 is a diagram explaining a determination area.

FIG. 10 is a diagram explaining a determination area in a case where the favorite screen, such as is shown in FIG. 3, is displayed. Note that the reference numeral "70A" in FIG. 10 indicates a user's first designated position, and "70B" indicates the user's second designated position.

As product images 22A to 22D are displayed in the favorite screen shown in FIG. 3, determination areas 72A to 72D are set in the example shown in FIG. 10. Note that, in the following, the determination areas 72A to 72D may be collectively referred to as a "determination area 72".

The determination area 72A is a determination area corresponding to the product image 22A of the product "A", and the area where the product image 22A is displayed is set as the determination area 72A. Similarly, the determination area 72B is a determination area corresponding to the product image 22B of the produce "B", and the area where the product image 22B is displayed is set as the determination area 72B. The determination area 72C is a determination area corresponding to the product image 22C of the produce "C", and the area where the product image 22C is displayed is set as the determination area 72C. The determination area 72D is a determination area corresponding to the product image 22D of the produce "D", and the area where the product image 22D is displayed is set as the determination area 72D.

In the example shown in FIG. 10, for example, the object moving unit 56 determines whether or not the first designated position 70A is included in any of the determination areas 72A to 72D. Further, the object moving unit 56 determines whether or not the second designated position 70B is included in any of the determination areas 72A to 72D.

When the first designated position is included in the first determination area corresponding to the first object, the object moving unit 56 moves the first object in accordance with movement of the first designated position. Further, when the second designated position is included in the second determination area corresponding to the second object, the object moving unit 56 moves the second object in accordance with movement of the second designated position.

In the example shown in FIG. 10, for example, as the first designated position 70A is included in the determination area 72B, the object moving unit 56 moves the product image 22B in accordance with movement of the first designated position 70A. That is, the object moving unit 56 causes the product image 22B to follow the first designated position 70A.

In the example shown in FIG. 10, as the second designated position 70B is included in the determination area 72C, the object moving unit 56 moves the product image 22C in accordance with movement of the second designated position 70B. That is, the object moving unit 56 causes the product image 22C to follow the second designated position 70B.

In the following, the collision determination unit 58 will be described. The collision determination unit 58 determines whether or not a first object has collided against a second object when at least one of the first and second objects has been moved by the object moving unit 56.

For example, the collision determination unit 58 determines whether or not the first object has collided against the second object by determining whether or not the distance between the first designated position and the second designated position has become equal to or smaller than a threshold. In other words, the collision determination unit 58 determines whether or not the distance between the first designated position and the second designated position has become equal to or smaller than the threshold when the first designated position is included in the first determination area and the second designated position is included in the second determination area, to thereby determine whether or not the first object has collided against the second object. The collision determination unit 58 determines that the first object has collided against the second object when at least one of the first and second objects has been moved by the object moving unit 56 and the distance between the first designated position and the second designated position has become equal to or smaller than the threshold.

In the example shown in FIG. 10, for example, the first designated position 70A is included in the determination area 72B, and the second designated position 70B is included in the determination area 72C. In this case, as described above, the object moving unit 56 moves the product image 22B in accordance with movement of the first designated position 70A and the product image 22C in accordance with movement of the second designated position 70B. In this case, as shown in FIG. 11, the collision determination unit 58 obtains the distance (d) between the first designated position 70A and the second designated position 70B, and determines whether or not the distance (d) has become equal to or smaller than the threshold to thereby determine whether or not the product image 22B has collided against the product image 22C.

When it is determined that the above-described distance (d) is equal to or smaller than the threshold, the collision determination unit 58 determines that the product image 22B has collided against the product image 22C. In the example shown in FIG. 11, although the determination area 72B overlaps the determination area 72C (that is, the product image 22B overlaps the product image 22C), the collision determination unit 58 does not determine the product image 22B has collided against the product image 22C unless the above-described distance (d) is equal to or smaller than the threshold.

Figure 11:
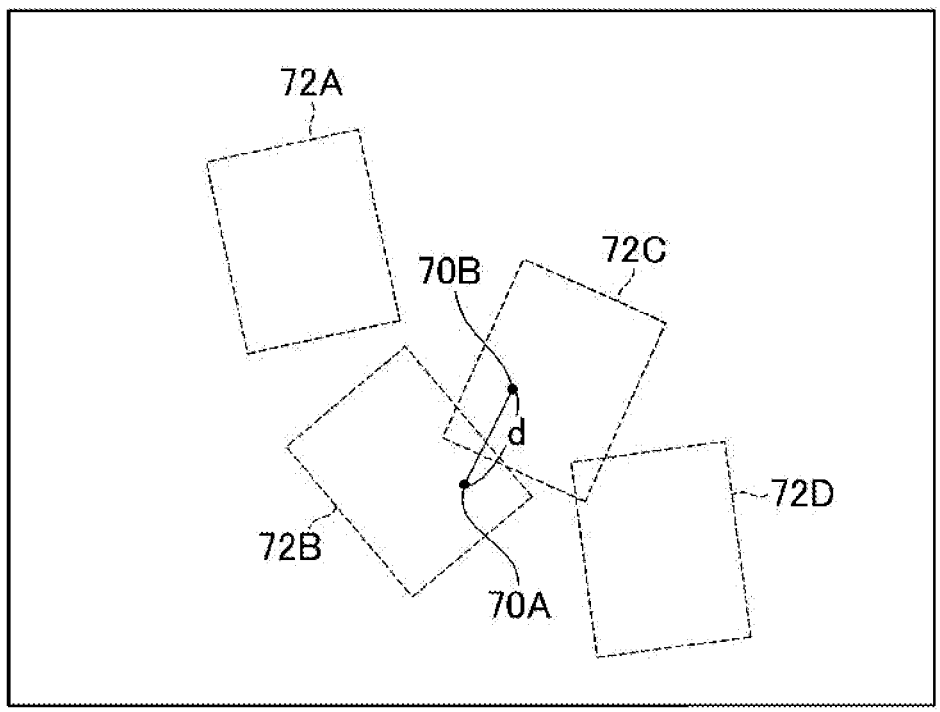
FIG. 11 is a diagram explaining a collision determining method.

In the example shown in FIG. 11, although the determination area 72C overlaps the determination area 72D (that is, the product image 22C overlaps the product image 22D), the collision determination unit 58 does not determine that the product image 22B has collided against the product image 22D as a user's designated position is not included in the determination area 72D.

In the following, the processing executing unit 60 will be described. The processing executing unit 60 executes processing relevant to the first object and the second object, based on the result of determination by the collision determination unit 58. For example, when it is determined that the first object has collided against the second object, the processing executing unit 60 displays a comparison screen for comparing attribute information correlated to the first object and attribute information correlated to the second object on the display unit 15.

For example, in the example shown in FIG. 11, when it is determined that the distance (d) between the first designated position 70A and the second designated position 70B has become equal to or smaller than the threshold (that is, when it is determined that the product image 22B has collided against the product image 22C), the processing executing unit 60 executes processing relevant to the product image 22B and the product image 22C.

In this case, the processing executing unit 60 displays a comparison screen, such as is shown in FIG. 5, on the display unit 15. That is, the processing executing unit 60 displays a comparison screen for comparing information on the product "B" correlated to the product image 22B and information on the product "C" correlated to the product image 22C on the display unit 15.

Figure 12:
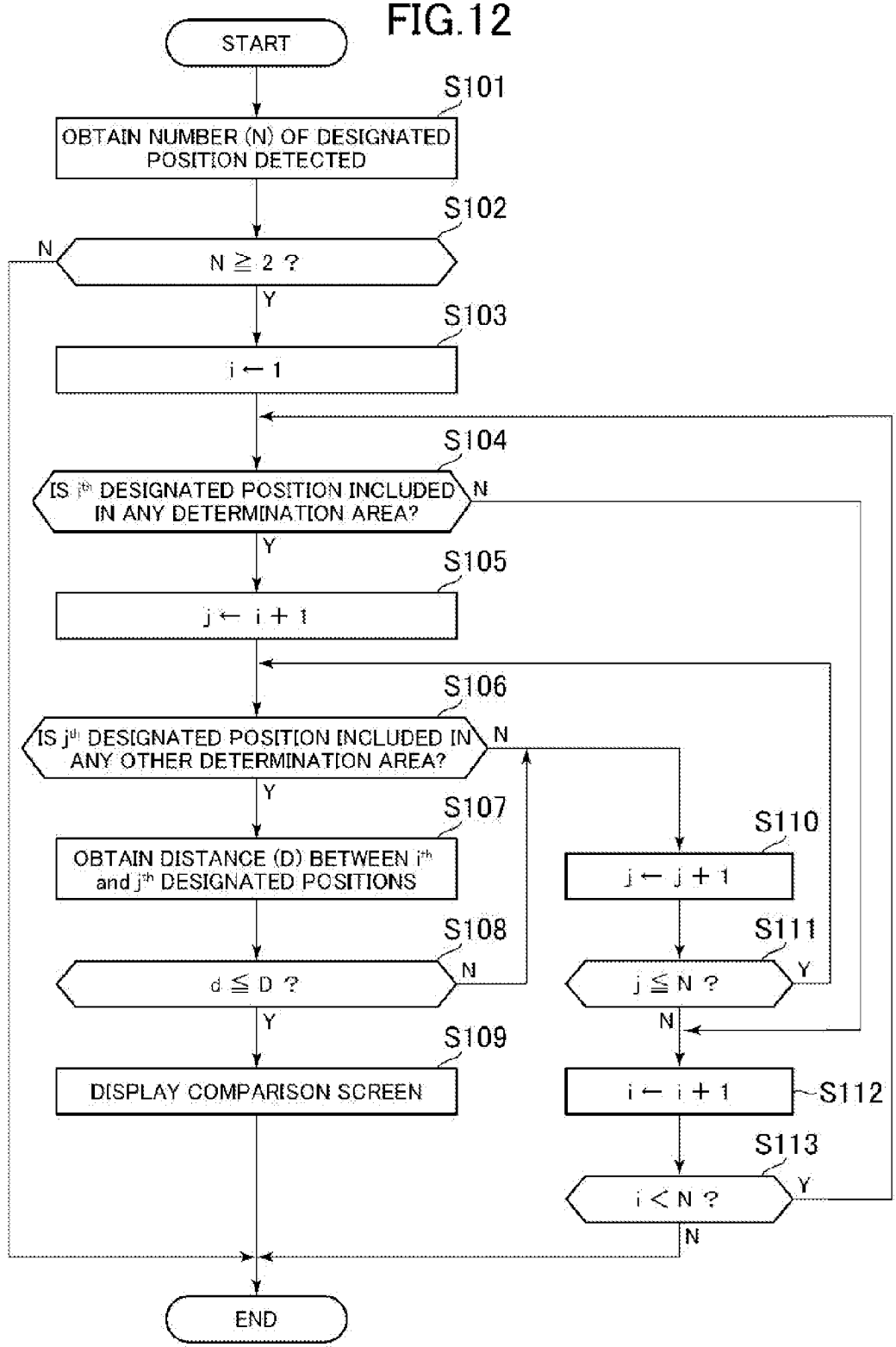
FIG. 12 is a flowchart of an example of processing executed in the information processing device.

In the following, processing that is executed by the information processing device 10 while the favorite screen is displayed will be described. FIG. 12 is a flowchart of an example of processing that is repetitively executed for every predetermined period of time (for example, $1/60^{th}$ of a second) in the information processing device 10 while the favorite screen is displayed. Note that processing for moving the product image 22 in accordance with change of a user's designated position is also executed while the favorite screen is displayed, which, however, is not shown in FIG. 12. FIG. 12 mainly shows processing for determining whether or not the product images 22 have collided. The control unit 11 executes the processing shown in FIG. 12 according to the program, thereby functioning as the detection result obtaining unit 54, the collision determination unit 58, and the processing executing unit 60.

As shown in FIG. 12, initially, the control unit 11 (detection result obtaining unit 54) obtains the number (N) of a user's designated positions detected by the detection unit (touch panel) (S101). Then, the control unit 11 determines whether or not the obtained number (N) is two or larger (S102). When the obtained number (N) is not two or larger, the control unit 11 terminates this processing.

Meanwhile, when the obtained number (N) is two or larger, the control unit 11 initialize the value of the variable i to 1 (S103). Then, the control unit 11 determines whether or not the $i^{th}$ designated position is included in any determination area 72 (S104). Note that "the $i^{th}$ designated position" refers to the $i^{th}$ designated position among the designated positions detected by the detection unit (touch panel).

When the $i^{th}$ designated position is included in any determination area 72, the control unit 11 initializes the value of the variable j to i+1 (S105), and determines whether or not the $j^{th}$ designated position is included in another determination area 72 (S106). Note that "another determination area 72" refers to a determination area 72 other than the determination area 72 that is determined at step S104 as including the $i^{th}$ designated position.

When the $j^{th}$ designated position is included in another determination area 72, the control unit 11 obtains the distance (d) between the $i^{th}$ designated position and the $j^{th}$ designated position (S107). Then, the control unit 11 (collision determination unit 58) determines whether or not the distance (d) is equal to or smaller than a threshold (D) (S108). When the distance (d) is equal to or smaller than the threshold (D), the control unit 11 (processing executing unit 60) determines that the product images 22 have collided, and displays the comparison screen (FIG. 5) on the display unit 15. In this case, a comparison screen for the product of the product image 22 corresponding to the determination area that is determined at step S104 as including the $i^{th}$ designated position and the product of the product image 22 corresponding to the determination area 72 that is determined at step S106 as including the $j^{th}$ designated position is displayed. The comparison screen is displayed based on the favorite table shown in FIG. 7.

Meanwhile, when it is not determined at step S104 that the $i^{th}$ designated position is included in any determination area 72, the control unit 11 increments the value of the variable i (S112), and then determines whether or not the variable i is smaller than the number (N) of the user's designated positions detected (S113). When it is determined that the variable i is smaller than the number (N) of the user's designated positions detected, the control unit 11 executes the processing at step S104. Meanwhile, when it is not determined that the variable i is smaller than the number (N) of the user's designated positions detected, the control unit 11 terminates this processing.

Further, when it is not determined at step S106 that the $j^{th}$ designated position is included in another determination area 72 or when it is not determined at step S108 that the distance (d) is equal to or smaller than the threshold (D), the control unit 11 increments the value of the variable j (S110), and then determines whether or not the value of the variable j is equal to or smaller than the number (N) of the user's designated positions detected (S111). When it is determined that the variable j is equal to or smaller than the number (N) of the user's designated positions detected, the control unit 11 executes the processing at step S106. Meanwhile, when it is not determined that the variable j is equal to or smaller than the number (N) of the user's designated positions detected, the control unit 11 executes the processing at step S112. Description on the processing shown in FIG. 12 is completed with the above.

According to the information processing device 10 in the above described first embodiment, when a user selects two product images 22 from among a plurality of product images 22 displayed in the favorite screen by pointing out the two product images 22 with his/her two fingers, and moves the two fingers to thereby move the two product images 22 so as to collide, a comparison screen for the two products is displayed. That is, according to the information processing device 10, a user can instruct the information processing device 10 to display a comparison screen for two produces through an intuitive operation of selecting and colliding two product images 22.

Note here that, for example, a drag and drop operation may be possibly employed as an operation for displaying a comparison screen for two products. That is, it is feasible to display a comparison screen for the two products when a user performs a drag operation to thereby move one product image 22 onto another product image 22 and then a drop operation with the products images 22 placed one on the other.

With the above described drag and drop operation employed, however, there may be a case in which a user may perform a drop operation with one product image 22 erroneously placed on a product image 22 other than his/her desired product image 22 when intending to move, through a drag operation, the one product image 22 onto his/her desired product image 22 among a plurality of densely placed product images 22 and then perform a drop operation. In such a case, a comparison image for two products not intended by the user is displayed.

Further, with the above described drag and drop operation employed, in a case where a user stops the drag operation halfway after having started moving one product image 22, if the one product image 22 happens to be placed on another product image 22, a comparison screen for these products is displayed. To address the above, the user needs to move the one product image 22 to a position not overlapping any other product image 22 before stopping the drag operation.

On the contrary, according to the information processing device 10 in the first embodiment, if a user initially selects both of the product images 22 of two products for comparison and then moves the product images 22 so as to collide, a comparison screen for the two products is displayed. With the above, the above described inconvenience is unlikely caused. That is, even though a product image 22 other than a desired product image 22 is selected, unless the product image 22 is caused to collide against another product image 22, a comparison screen for these products is not displayed. In this case, the user simply detaches his/her finger from the touch panel, and selects again a product image 22. As described above, according to the information processing device 10 in this embodiment, a comparison screen for two products not intended by a user is unlikely displayed. Further, according to the information processing device 10 in the first embodiment, the user does not need to particularly care the position of the product image 22 when stopping the ongoing operation halfway as a comparison screen for products is not displayed unless the product images 22 selected by the user collide even though the selected product image 22 is positioned on another product image 22.

Further, an operation for simply selecting both of the product images 22 of two products for comparison may be applicable as an operation for displaying a comparison screen for the two products. That is, it is feasible that, when a user selects one product image 22 and then another product image 22, a comparison screen for these products may be displayed. However, with such an operation employed, when a user erroneously selects a product image 22 other than his/her desired product image 22 as a second product image 22, a comparison screen for two products not intended by the user is displayed. On the contrary, according to the information processing device 10 in the first embodiment, as described above, a comparison screen for two products not intended by a user is unlikely displayed.

Further, as an operation for displaying a comparison screen for two products, an operation described below, for example, may be employed:
(a) click the left button of a mouse while pointing out one product image 22 with the mouse to thereby select the product image 22;
(b) click the left button of the mouse while pointing out another product image 22 with the mouse to thereby select the product image 22; and
(c) click thereafter the right button of the mouse to thereby instruct to display a comparison screen for the products of these product images 22.

The above described operation, however, requires a left button and a right button of a mouse, and thus cannot be employed in an information processing device having no mouse. For example, a tablet-type information processing device having a touch panel but a mouse cannot employ the above-described operation. On the contrary, an operation employed in the information processing device 10 according to the first embodiment can be employed in an information processing device having no mouse.

According to the information processing device 10 in the first embodiment, it is possible to improve accuracy in determining whether or not a user has collided the product images 22 displayed in the favorite screen.

As a collision determination method for the product images 22, there may be available a method for determining whether or not the product images 22 contact each other or are placed one on the other to thereby determine whether or not the product images 22 have collided. However, when an screen is small in the size or when a larger number of product images 22 in view of the size of the screen are displayed in the screen, product images 22 likely contact each other or are placed one on the other. Therefore, according to the above-described collision determining method, it is likely to be determined that the product images 22 have collided. As a result, it may be determined that the product images 22 have collided despite lack of a user's intention of colliding the product images 22, which may be felt stressful by a user.

On the contrary, according to the information processing device 10 in the first embodiment, determination as to whether or not product images 22 have collided is made based on two positions designated by a user. Consequently, according to the information processing device 10 in the first embodiment, it is possible to avoid determining that the product images 22 have collided despite lack of a user's intention of colliding the product images 22.

Note that the first embodiment can be arranged as described below.

[1] In the example shown in FIG. 11, for example, when the object moving unit 56 moves the product image 22B and the product image 22C, the collision determination unit 58 may determine whether or not "a state in which the distance (d) between the first designated position 70A and the second designated position 70B is equal to or smaller than a threshold" lasts for a reference period of time. In other words, the collision determination unit 58 may determine whether or not "a state in which the first designated position 70A is included in the determination area 72B, the second designated position 70B is included in the determination area 72C, and the distance (d) between the first designated position 70A and the second designated position 70B is equal to or smaller than a threshold" lasts for a reference period of time. Then, when the above-described state lasts for the reference period of time, the control unit 11 may determine the product image 22B has collided against the product image 22C.

With the above, it is possible to avoid determining that the product image 22B has collided against the product image 22C when the above described distance (d) temporarily becomes equal to or smaller than the threshold despite lack of a user's intention of colliding the product image 22B and the product image 22C. In this manner, it is possible to further improve accuracy in determining whether or not a user has collided the product images 22 displayed in the favorite screen.

Figure 13:
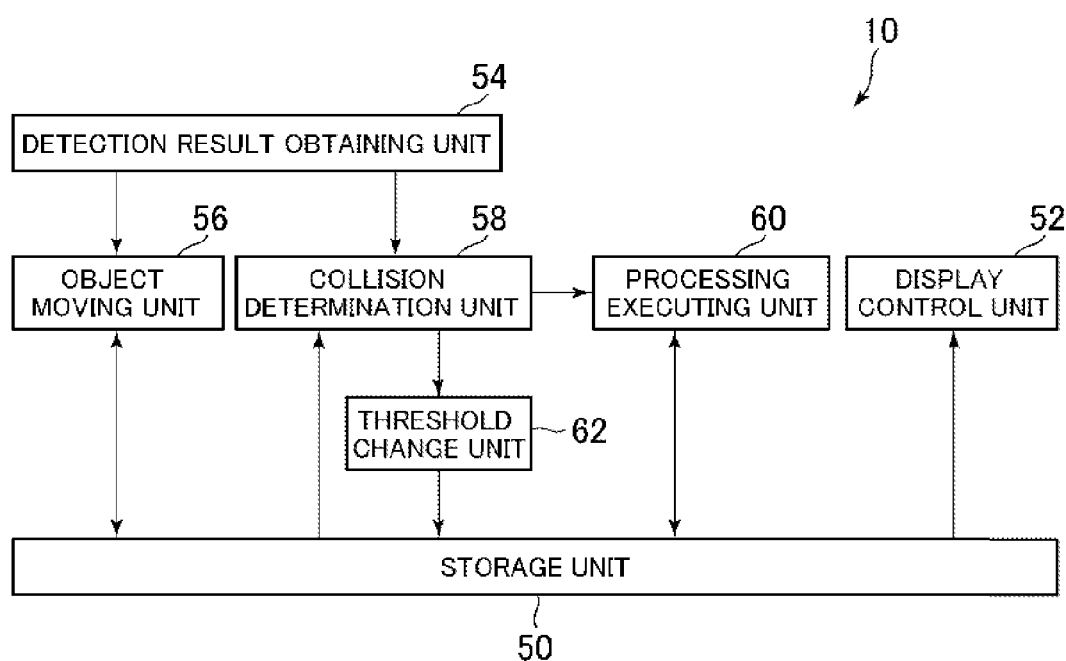
FIG. 13 is a functional block diagram of the information processing device.

[2] As shown in FIG. 13, for example, the information processing device 10 may include a threshold change unit 62.

The threshold change unit 62 decreases the threshold, based on a distance between a user's first designated position and second designated position, the distance being determined in the past by the collision determination unit 58 as being equal to or smaller than a threshold while the first designated position and second designated position are detected by a detection unit.

Figure 14:
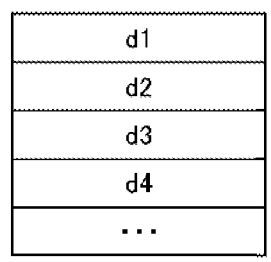
FIG. 14 shows one example of history data.

For example, the threshold change unit 62 stores in the storage unit 50 (the auxiliary storage unit 13) history data on history of the above described distance determined by the collision determination unit 58 in the past as being equal to or smaller than a threshold. FIG. 14 shows one example of the history data. For example, when the collision determination unit 58 determines that the above-described distance is equal to or smaller than a threshold, the threshold change unit 62 additionally registers the distance to the history data shown in FIG. 14.

For example, the threshold change unit 62 calculates the average of the distances registered as the history data. Further, the threshold change unit 62 calculates the difference ($\Delta d$) between the average and the threshold, and decreases the threshold in accordance with the difference ($\Delta d$). In this case, the threshold change unit 62 decreases the threshold in a range not falling short of the average.

Specifically, for example, the threshold change unit 62 determines whether or not the above-described difference ($\Delta d$) is equal to or larger than a predetermined reference value. Then, when the above-described difference ($\Delta d$) is equal to or larger than the predetermined reference value, the threshold change unit 62 changes the threshold (D), using the expression (1) below, in which "k" in the expression (1) is a coefficient set to a value larger than 0 but smaller than 1 (for example, 0.7)

$$D=D-\Delta d*k \qquad (1)$$

Note that the threshold change unit 62 may change the threshold (D) according to the above described expression (1), irrespective of whether the above-described difference ($\Delta d$) is equal to or larger than a predetermined reference value.

With a smaller threshold for the collision determination unit 58, it is less likely determined that objects have collided despite lack of a user's intension of colliding the objects (product images 22). That is, with a smaller threshold for the collision determination unit 58, it is possible to improve accuracy in determining whether or not a user has collided objects displayed in a screen.

In this regard, according to the above described threshold change unit 62, it is possible to decrease the threshold with respect to a user who tends to move two fingers pointing out objects so as to get very close to each other when making the objects contact each other (that is, a user who tends to leave the distance between the two designated positions very small when making the objects contact each other). Consequently, it is possible to improve accuracy in determining whether or not a user has collided objects displayed in a screen.

Second Embodiment

An information processing device according to a second embodiment of the present invention will be described. An information processing device 10 according to the second embodiment has a similar hardware structure as that of the information processing device 10 according to the first embodiment (see FIG. 1).

Figures 15, 16:
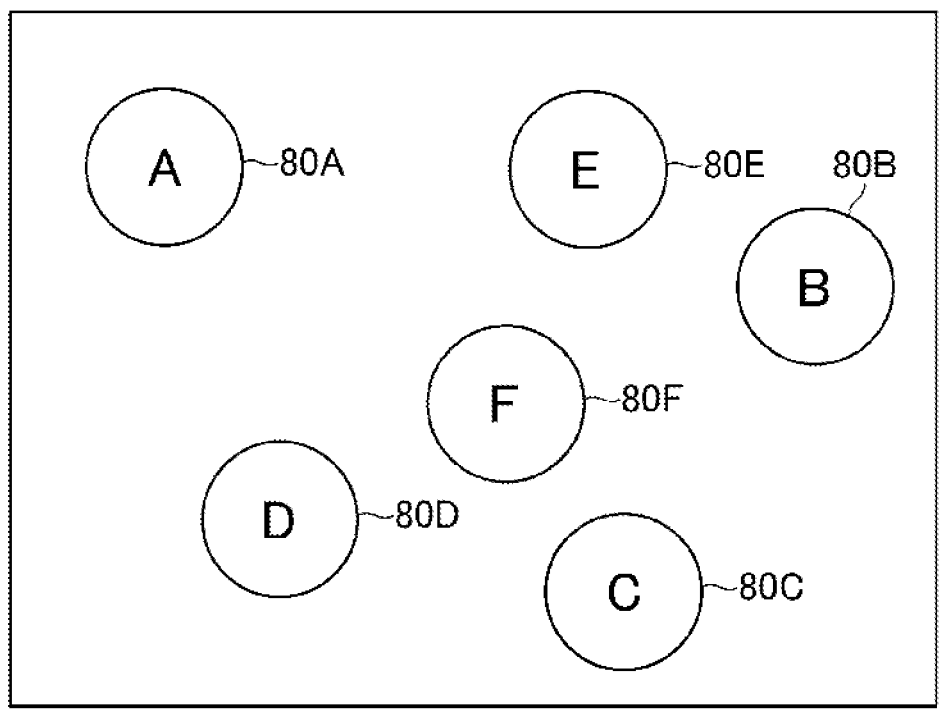
FIG. 15 shows one example of an authentication screen.
FIG. 16 shows one example of reference combination information and reference direction information.

According to the information processing device 10 in the second embodiment, an authentication screen, such as is shown in FIG. 15, for example, is displayed upon turning on the power, releasing screen lock, retrieving from the sleep mode, or the like. This authentication screen is displayed instead of a general authentication screen, such as one for receiving four-digit number input as a password, for example.

In the authentication screen shown in FIG. 15, a plurality of objects 80A to 80F is displayed. Initial display positions of objects 80A to 80F are determined at random. Further, different display manners are set to the respective objects 80A to 80F so that a user can distinguish the objects 80A to 80F. That is, in the example shown in FIG. 15, different letters are given to the respective objects 80A to 80F. Note that display manners of the objects 80A to 80F may be set to any manner as long as the manner allows a user to distinguish the respective objects 80A to 80F. For example, different symbols or numbers may be given to the respective objects 80A to 80F; the respective objects 80A to 80F may be displayed in different colors or shapes; or different images may be used for the respective objects 80A to 80F. Note that the objects 80A to 80F may be hereinafter collectively referred to as the object 80.

In the following, an arrangement for implementing user authentication in an authentication screen shown in FIG. 15 will be described. According to the information processing device 10 in the second embodiment, a user designates in advance two objects among the objects 80A to 80F displayed in the authentication screen. That is, the user designates in advance a first object 80 and a second object 80 among the objects 80A to 80F. The user also designates in advance collision manners (how to collide) of these objects 80. For example, a user designates in advance a positional relationship between these objects 80 in collision. Specifically, a user designates in advance the direction from the first object 80 to the second object 80 (a direction in the screen coordinate system).

Information indicating a combination of objects 80 designated in advance by a user (hereinafter referred to as "reference combination information") and vector information indicating the above described direction designated in advance by the user (hereinafter referred to as "reference direction information") is stored encrypted in the auxiliary storage unit 13. FIG. 16 shows one example of the reference combination information and the reference direction information stored in the auxiliary storage unit 13. In the example shown in FIG. 16, the object 80C given the letter "C" is designated as the first object 80, while the object 80F given the letter "F" is designated as the second object. The reference combination information and the reference direction information stored in the auxiliary storage unit 13 are used as information for executing user authentication. That is, these information items are used as information having the same function as that of a general user ID and a general password.

In a case in which reference combination information and reference direction information, such as are shown in FIG. 16, are stored, a user collides the object 80C given the letter "C" against the object 80F given the letter "F" in the authentication screen shown in FIG. 15. In the above, simple collision between these objects 80C and 80F is not sufficient, and the user is required to collide the objects 80C and 80F such that the direction from the object 80C, designated as the first object 80, to the object 80F, designated as the second object 80, substantially coincides with the direction indicated by the reference direction information. When the objects 80C and 80F collide such that the direction from the object 80C to the object 80F substantially coincides with the direction indicated by the reference direction information, the user is judged authentic, upon which user authentication is duly completed.

The above described authentication screen can provide higher security, compared to an authentication screen or the like for receiving a four-digit number input as a password. Further, according to the above described authentication screen, an operation required of a user to perform user authentication is a relatively simple operation of colliding two predetermined objects 80 in a predetermined direction, and no complicated operation (input) is required of a user. That is, according to the above described authentication screen, it is possible to improve security while ensuring not to require a user to perform a complicated operation (input).

In the following, a structure for implementing the above described authentication screen will be described. The information processing device 10 in the second embodiment has functional blocks similar to those of the information processing device 10 in the first embodiment (see FIG. 6 or 13). In the following, a difference from the first embodiment as to the respective functional blocks in the second embodiment will be mainly described.

The storage unit 50 stores the display positions of the objects 80A to 80F displayed in the authentication screen. Further, the storage unit 50 (reference information storage means) stores the reference combination information and the reference manner information. The "reference combination information" is information indicating a combination of two objects 80 designated in advance by a user among a plurality of objects 80A to 80F. The "reference manner information" is information on a manner designated by a user as a collision manner (how to collide) of these two objects 80. For example, the "reference manner information" includes information on a positional relationship between the above described two objects 80 in collision. For example, the reference combination information and the reference direction information, such as are shown in FIG. 16, are stored in the storage unit 50.

The display control unit 52 displays an authentication screen, such as is shown in FIG. 15, for example, on the display unit 15.

When the collision determination unit 58 determines that two objects 80 among the objects 80A to 80F displayed in the authentication screen have collided, the processing executing unit 60 executes processing relevant to these two objects 80, based on the collision manner of these two objects 80.

For example, when the collision determination unit 58 determines that two objects 80 among the objects 80A to 80F displayed in the authentication screen have collided, the processing executing unit 60 (combination determination unit) determines whether or not the combination of these two objects 80 coincides with the combination indicated by the reference combination information. Further, the processing executing unit 60 (manner comparing means) compares the collision manner of these two objects 80 and that indicated by the reference manner information. Then, the processing executing unit 60 (authentication processing executing means) executes authentication processing, based on the result of determination as to whether or not the above-described combination coincides with the combination indicated by the reference combination information and the result of comparison between the above described collision manner and the collision manner indicated by the reference manner information. Details on the processing executing unit 60 will be described later (see FIG. 17).

In the following, processing that is executed by the information processing device 10 while the authentication screen is displayed will be described. The processing executed in the information processing device 10 with the authentication screen displayed is similar to the processing shown in FIG. 12. That is, processing similar to that shown in FIG. 12 is repetitively executed for every predetermined period of time (for example, $\frac{1}{60}^{th}$ of a second) while the authentication screen is displayed. Therefore, processing executed in the information processing device 10 with the authentication screen displayed will be described with reference to FIG. 12. Note that processing for moving the objects 80A to 80F in accordance with change of a user's designated position is also executed while the authentication screen is displayed, though not described here.

When the authentication screen is displayed, the control unit 11 (detection result obtaining unit 54) obtains the number (N) of a user's designated positions detected by the detection unit (touch panel) (S101). Then, the control unit 11 determines whether or not the number (N) is two or larger (S102). When the above-described number (N) is two or larger, the control unit 11 initializes the value of the variable i to one (S103). Then, the control unit 11 determines whether or not the $i^{th}$ designated position is included in any determination area (S104). Note that the "determination area" is an area that is set based on the display position of the object 80 and is set for determining whether or not a user is pointing out the object 80.

When the $i^{th}$ designated position is included in any determination area, the control unit 11 initializes the value of the variable j to i+1 (S105), and then determines whether or not the $j^{th}$ designated position is included in another determination area (S106). When the $j^{th}$ designated position is included in another determination area, the control unit 11 obtains the distance (d) between the $i^{th}$ designated position and the $j^{th}$ designated position (S107). Then, the control unit 11 (collision determination unit 58) determines whether or not the distance (d) is equal to or smaller than the threshold (D) (S108).

Note that processing that is executed when it is not determined at step S104 that the $i^{th}$ designated position is included in any determination area is similar to that in the first embodiment. Further, processing that is executed when it is not determined at step S106 that the $j^{th}$ designated position is included in another determination area or when it is not determined at step S108 that the above-described distance (d) is equal to or smaller than the threshold (D) is also similar to that in the first embodiment.

When it is determined at step S108 that the above-described distance (d) is equal to or smaller than the threshold (D), the control unit 11 determines that the objects 80 have collided. In this case, the control unit 11 (processing executing unit 60) executes the processing shown in FIG. 17, instead of the processing at step S109.

That is, the control unit 11 (combination determination unit) determines whether or not the combination of the objects 80 in collision coincides with the combination indicated by the reference combination information (S201). For example, when the reference combination information shown in FIG. 16 is stored, the control unit 11 determines whether or not one of the objects 80 in collision is the object 80C given the letter "C" designated in advance as the first object 80, and then determines whether or not the other of the objects 80 in collision is the object 80F given the letter "F" designated in advance as the second object 80.

Figures 18, 19:
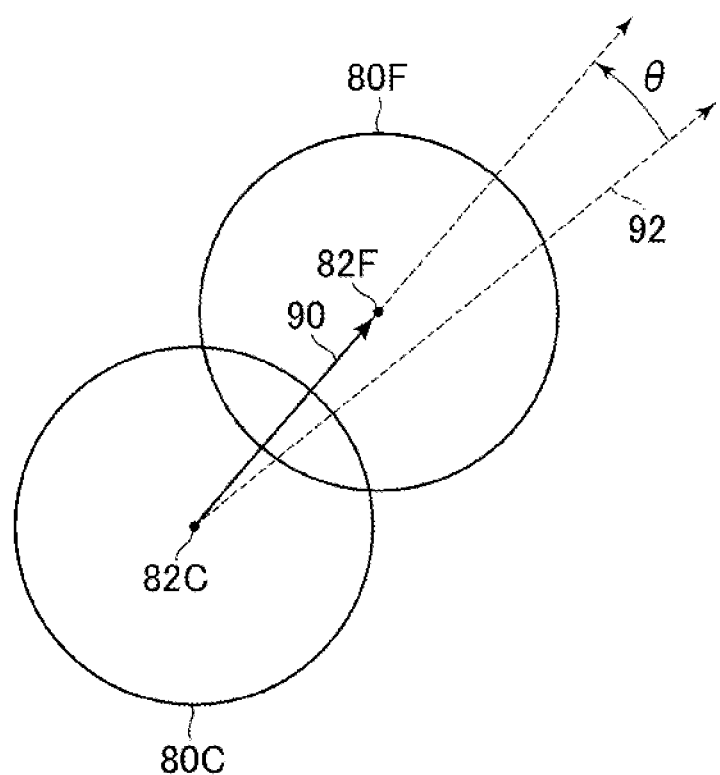
FIG. 18 is a diagram explaining processing executed in the information processing device.
FIG. 19 shows one example of reference combination information and reference speed information.

When the combination of the objects 80 in collision coincides with the combination indicated by the reference combination information, the control unit 11 obtains the direction from the first object 80 to the second object 80 (S202). For example, when the reference combination information shown in FIG. 16 is stored, the control unit 11 obtains the direction from the object 80C given the letter "C" to the object 80F given the letter "F". Specifically, as shown in FIG. 18, the control unit 11 obtains the direction 90 from the representative position 82C (for example, the center point) of the object 80C to the representative position 82F (for example, the center point) of the object 80F.

After execution of step S202, the control unit 11 (direction determination means) obtains the angle (θ) between the direction obtained at step S202 and the direction indicated by the reference direction information (S203). For example, when the reference combination information shown in FIG. 16 is stored, the control unit 11 obtains the angle (θ) between the direction 90 from the object 80C given the letter "C" to the representative position 82F of the object 80F given the letter "F" and the direction 92 indicated by the reference direction information, as shown in FIG. 18.

After execution of step S203, the control unit 11 (direction determination means) determines whether or not the angle (θ) obtained at step S203 is equal to or smaller than the reference angle (θc) (S204). When it is determined that the above-described angle (θ) is equal to or smaller than the reference angle (θc), the control unit 11 determines that the direction obtained at step S202 substantially coincides with the direction indicated by the reference direction information. In this case, the control unit 11 (authentication processing executing means) judges the user authentic, and allows the user to use the information processing device 10 (S205). For example, the control unit 11 displays the menu screen on the display unit 15.

Meanwhile, when it is not determined that the above-described angle (θ) is equal to or smaller than the reference angle (θc), the control unit 11 (authentication processing executing means) judges the user not authentic, and displays an error message (S206). Note that when it is not determined at S201 that the combination of the objects 80 in collision coincides with the combination indicated by the reference combination information, the control unit 11 (authentication processing executing means) judges the user not authentic, and displays an error message (S206). In these cases, the control unit 11 does not allow the user to use the information processing device 10. Description on the processing that is executed while the authentication screen is displayed is completed with the above.

According to the above described information processing device 10 in the second embodiment, it is possible to increase security while ensuring not to require a user to perform a complicated operation (input).

Note here that, for example, when the reference combination information shown in FIG. 16 is stored, a user needs to collide the objects 80C and 80F such that the direction from the object 80C given the letter "C" to the object 80F given the letters "F" substantially coincides with the direction indicated by the reference direction information, as described above. In this case, before colliding the objects 80C and 80F, a user moves at least one of the objects 80C and 80F to change the positional relationship between the objects 80C and 80F into one that allows collision between the objects 80C and 80F such that the direction from the object 80C to the object 80F substantially coincides with the direction indicated by the reference direction information.

However, for example, when the screen is small in the size or when a relative larger number of objects 80 in view of the size of the screen are displayed in the screen, the objects 80 likely contact each other or are placed one on the other. Therefore, it is probable that objects 80C and 80F contact each other or placed one on the other in the process of changing the positional relationship between the objects 80C and 80F. In such a case, according to a conventional determination method, it is determined that the objects 80C and 80F have collided against each other, and authentication processing is thus executed based on the direction from the object 80C to the object 80F.

On the contrary, according to the information processing device 10 in the second embodiment, similar to the first embodiment, whether or not the objects 80 have collided is determined, based on a user's two designated positions. As a result, it is possible to avoid determining that objects 80 have collided in the process performed by a user to adjust the positional relationship between the objects 80.

Note that the second embodiment may be arranged as described below.

Figure 17:
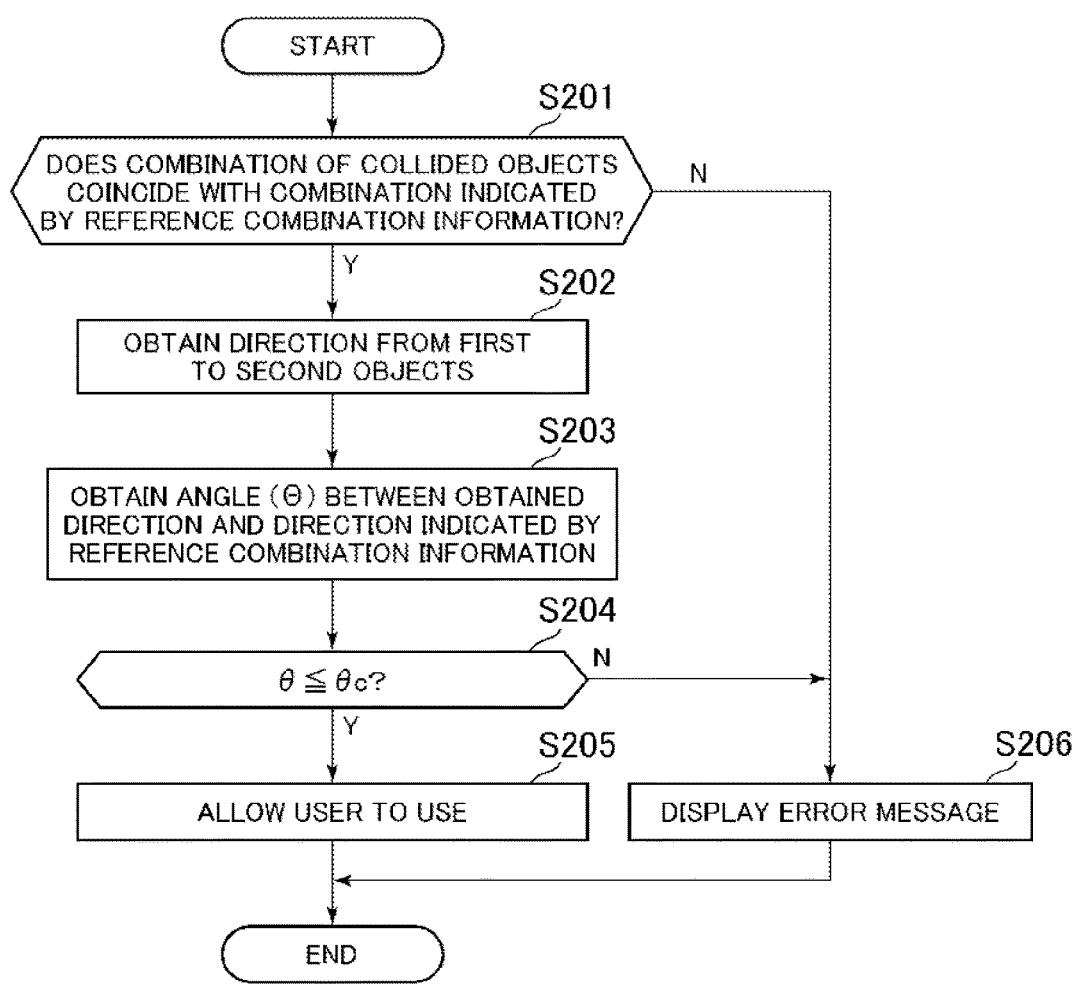
FIG. 17 is a flowchart of one example of processing executed in the information processing device.

[1] At step S202 in FIG. 17, the direction from a designated position that is determined as being included in the determination area of the first object 80 to another designated position that is determined as being included in the determination area of the second object 80 may be obtained, instead of the direction from the representative position (for example, the center point) of the first object 80 to the representative position (for example, the center point) of the second object 80. Alternatively, the direction from the representative position (for example, the center point) of the first object 80 to a designated position that is determined as being included in the determination area of the second object 80 may be obtained. Still alternatively, the direction from a designated position that is determined as being included in the determination area of the first object 80 to the representative position (for example, the center point) of the second object may be obtained.

[2] According to the above described authentication method, when a user has made two objects 80 designated in advance as the first object 80 and the second object 80 contact each other such that the direction from the first object 80 to the second object 80 substantially coincides with the direction indicated by the reference direction information, the user is judged authentic. Alternatively, a user may be judged authentic when the user has made two objects 80 designated in advance by the user contact each other such that the direction from one of the two objects 80 to the other substantially coincides with the direction indicated by the reference direction information.

When the reference combination information and reference direction information shown in FIG. 16, for example, are stored, the user may be judged authentic not only when the user has made two objects 80C and 80F contact each other such that the direction from the object 80C given the letter "C" to the object 80F given the letter "F" substantially coincides with the direction indicated by the reference direction information, but also when the user has made two objects 80C and 80F contact each other such that the direction from the object 80F given the letter "F" to the object 80C given the letter "C" substantially coincides with the direction indicated by the reference direction information as well.

[3] According to the above described authentication method, a user designates in advance a combination of two objects 80 and the direction from the first object 80 to the second object 80. Alternatively, instead of designating in advance the above-described direction, a user may designate in advance the relative speed of the first object 80 relative to the second object 80.

In this case, information indicating a combination of the objects 80 designated in advance by a user (hereinafter referred to as "reference combination information") and information indicating the above described relative speed designated in advance by the user (hereinafter referred to as "reference relative speed information") are stored encrypted in the auxiliary storage unit 13. FIG. 19 shows one example of the reference combination information and reference relative speed information stored in the auxiliary storage unit 13. In the example shown in FIG. 19, "v" indicates a speed designated as a relative speed of the first object 80 (the object 80C given the letter "C") relative to the second object 80 (the object 80F given the letter "F").

When the reference combination information and reference relative speed information, such as are shown in FIG. 19, are stored, a user collides the object 80C given the letter "C" against the object 80F given the letter "F" in the authentication screen shown in FIG. 15. In the above, it is not sufficient to simply collide these objects 80C and 80F, but the user needs to collide the objects 80C and 80F such that the relative speed of the object 80C relative to the object 80F substantially coincides with the relative speed indicated by the reference relative speed information. When the objects 80C and 80F collide such that the relative speed of the object 80C relative to the object 80F substantially coincides with the relative speed indicated by the reference relative speed information, the user is judged authentic, upon which user authentication is duly terminated.

In this case, at step S202 in FIG. 17, the control unit 11 obtains the respective speeds of the objects 80 in collision, and then obtains the relative speed of the object 80 designated as the first object 80 relative to the object 80 designated as the second object 80. For example, when the reference combination information shown in FIG. 19 is stored, the respective speeds of the object 80C given the letter "C" and the object 80F given the letter "F" in collision are obtained, and the relative speed of the object 80C relative to the object 80F is obtained. Then, at step S203, the control unit 11 (relative speed determination means) obtains the speed difference between the relative speed obtained at step S202 and the relative speed indicated by the reference relative speed information. Further, at step S204, the control unit 11 (relative speed determination means) determines whether or not the speed difference is equal to or smaller than a reference difference. When it is determined that the above-described speed difference is equal to or smaller than the reference difference, the control unit 11 (authentication processing executing means) judges the user authentic, and allows the user to use the information processing device 10.

Note that, at step S202, instead of obtaining the speed of the object 80, the control unit 11 may obtain the speed of a designated position determined as being included in the determination area of the object 80. Then, the control unit 11 may obtain the relative speed of a designated position determined as being included in the determination area of the first object 80 relative to a designated position determined as being included in the determination area of the second object 80. Note that the control unit 11 may obtain the relative speed of the first object 80 relative to a designated position determined as being included in the determination area of the second object 80 or the relative speed of a designated position determined as being included in the determination area of the first object 80 relative to the second object 80.

According to the above described authentication method, when a user has made two objects 80 designated in advance as the first and second objects 80 contact each other such that the relative speed of the first object 80 relative to the second object 80 substantially coincides with the relative speed indicated by the reference relative speed information, the user is judged authentic. However, a user may be judged authentic when the user has made two objects 80 designated in advance by the user contact each other such that the relative speed of one of the two objects 80 relative to the other substantially coincides with the relative speed indicated by the reference relative speed information.

For example, when reference combination information and reference relative speed information shown in FIG. 19 is stored, a user may be judged authentic not only when the user has made two objects 80C and 80F contact each other such that the relative speed of the object 80C relative to the object 80F substantially coincides with the relative speed indicated by the reference relative speed information but also when the user has made two objects 80C and 80F contact each other such that the relative speed of the object 80F relative to the object 80C substantially coincides with the relative speed indicated by the reference relative speed information.

[4] Note that both of the above-described reference direction information and reference relative speed information may be stored together with the reference combination information in the auxiliary storage unit 13. That is, a combination of two objects 80, the direction from the first object 80 to the second object 80, and the relative speed of the first object 80 relative to the second object 80 may be designated by a user in advance, and authentication processing may be executed based on these.

For example, when the reference combination information shown in FIGS. 16 and 19, the reference direction information shown in FIG. 16, and the reference relative speed information shown in FIG. 19 are stored, if a user has collided the objects 80C and 80F such that the direction from the object 80C to the object 80F substantially coincides with the direction indicated by the reference direction information and the relative speed of the object 80C relative to the object 80F substantially coincides with the relative speed indicated by the reference relative speed information, the user may be judged authentic.

[5] In the second embodiment as well, similar to the first embodiment, the collision determination unit 58 may determine whether or not "a state in which a user's first designated position is included in the determination area of one object 80, the user's second designated position is included in the determination area of another object 80, and the distance (d) between the first designated position and the second designated position is equal to or smaller than a threshold" lasts for a reference period of time. In other words, when the object moving unit 56 moves one object 80 and another object 80, the collision determination unit 58 may determine whether or not "a state in which the distance (d) between the first designated position and the second designated position is equal to or smaller than a threshold" lasts for a reference period of time. Then, when the above-described state lasts for a reference period of time, the control unit 11 may determine that the one object 80 has collided against the other object 80.

With the above, when the above described distance (d) has temporarily become equal to or smaller than a threshold despite lack of an intention of colliding two objects 30, it is not determined that these two objects have collided. In this manner, it is possible to further improve the accuracy in determining whether or not a user has collided the objects 80 displayed in the authentication screen.

Note that the present invention is not limited to the above described first and second embodiments.

[1] For example, the above described collision determining method can be used with various screens.

For example, in determining whether or not a user has collided icons in a screen where a plurality of icons each correlated to a file or a folder (directory) are displayed, the above described collision determining method can be used.

When a user has collided icons in this screen, the files (folders) correlated to the two respective icons may be unified. Alternatively, a difference between the files (folders) correlated to the two respective icons may be displayed. Alternatively, a file (folder) correlated to one icon may be overwritten by a file (folder) correlated to the other icon. Still alternatively, the files (folders) correlated to the two respective icons may be erased.

Note that the processing executing unit 60 may change the content of processing relevant to the icons in collision, based on the collision manner of the icons. For example, the processing executing unit 60 may selectively execute any of the above described processing, based on the collision manner of the icons. In this case, data for correlating information describing a collision manner of icons and information describing the content of processing relevant to icons in collision (for example, information indicating any of the above described processing) may be stored in the storage unit 50. Then, based on the data, the processing executing unit 60 may execute processing correlated to the collision manner of the icons as processing relevant to the icons in collision.

Note here that, for example, "information describing a collision manner of icons" refers to information indicating a positional relationship between two icons in collision, being specifically information indicating the direction from one of the two icons in collision to the other. With the above, it is possible to change the content of processing relevant to these two icons, based on the direction from one of the two icons in collision to the other.

Further, for example, "information describing a collision manner of icons" refers to information indicating a speed relationship between two icons in collision, being specially information indicating the relative speed of one of the two icons in collision relative to the other. With the above, the content of processing relevant to the two icons can be changed, based on the relative speed of one of the two icons in collision relative to the other.

When image data is correlated to an icon, image data resulting from combination of image data items correlated to two respective icons in collision may be displayed.

Further, the above described collision determining method can be used in determining whether or not a user has collided game characters in a game screen where a plurality of game characters are displayed, for example.

That is, when a user collides game characters in the game screen, a comparison screen for comparing parameter information items (attribute information) of these game characters may be displayed. Alternatively, the game characters may communicate with each other. Further alternatively, these game characters may fight. Note that the processing executing unit 60 may change the content of processing relevant to the game characters in collision, based on the collision manner of the game characters. For example, the processing executing unit 60 may selectively execute any of the above described processing, based on the collision manner of the game characters.

In a case in which game characters are caused to fight against each other when a user collides the game characters, the parameter information items (attribute information) of these game characters may be compared to each other to determine a winner and a lower. Then, a winner game character may be left in game screen, while a loser game character may disappear from the game screen. Note that the loser game character may move to an end of the game screen.

Further, the above described collision determining method can be used with a recipe search screen, for example, where an icon correlated to a raw material (material) is displayed.

That is, when a user has collided icons in the recipe search screen, a menu which can be made using the materials correlated to these icons is searched for, and a recipe of the menu is displayed. The above described collision determining method can be used also in determining whether or not a user has collided icons in such a recipe search screen.

[2] It is described in the above that two objects are movable when being pointed out by a user with his/her two fingers. That is, one object moves in accordance with movement of one finger, and the other object moves in accordance with movement of the other finger.

However, only one of the two objects pointed out by a user with his/her two fingers may be movable. In this case, for example, only the object first pointed out by the user may be movable, or only the object second pointed out by the user may be movable.

Here, assume a case of an example shown in FIGS. 4, 10, and 11, for example. Further, assume a case in which only the product image 22 first pointed out by a user is movable. In this case, supposing that the user points out the product image 22C prior to the product image 22B, the user can move only the product image 22C. In this case, the user moves the finger pointing out the product image 22C toward the finger pointing out the product image 22B, whereby the product image 22C is made colliding against the product image 22B.

[3] For example, the screen displayed on the display unit 15 may be generated using a 3D computer graphics technique. For example, a screen showing a picture of a 3D space where a plurality of objects is placed viewed from a virtual camera may be displayed on the display unit 15.

[4] For example, the designation unit (operating unit 14) for use by a user to designate a position in a screen displayed on the display unit 15 may not be provided overlapping the display unit 15, but apart from the display unit 15.

The invention claimed is:

1. An information processing device, comprising:
at least one non-transitory memory operable to store program code;
and at least one processor operable to read said program code and operate as instructed by said program code, said program code comprising:
display control code configured to cause the at least one processor to display a screen including a plurality of objects on a display;
detection result obtaining code configured to cause the at least one processor to obtain a result of detection by detector capable of detecting a plurality of a user's designated positions in the screen;
object moving code configured to cause the at least one processor to move, in a case where one of the user's designated position is detected by the detector and the one designated position is included in a determination area that is set based on a position of one object among the plurality of objects, the one object in accordance with movement of the one designated position;
collision determination code configured to cause the at least one processor to determine, in a case where at least one of a first object and a second object is moved by the object moving code, determining whether or not the first object and the second object collide with each other; and
processing executing code configured to cause the at least one processor to execute processing relevant to the first object and the second object based on a result of determination by the collision determination code, wherein
the processing executing code is further configured to cause the at least one processor to:
obtain a first attribute information correlated to the first object and a second attribute information correlated to the second object stored in attribute information storage, which stores attribute information correlated to each of the plurality of objects, in a case where it is determined that the first object and the second object collide with each other, and
display on the display a comparison screen for comparing the first attribute information correlated to the first object and the second attribute information correlated to the second object, the comparison screen simultaneously displaying both the first attribute information correlated to the first object and the second attribute information correlated to the second object, wherein both the first attribute information and the second attribute information correspond to a same first attribute, wherein the displayed first attribute information is correlated to the first object but is not correlated to the second object, and the displayed second attribute information is correlated to the second object, but is not correlated to the first object.

2. A control method for an information processing device, the control method comprising:
a display control operation of displaying a screen including a plurality of objects on a display;
a detection result obtaining operation of obtaining a result of detection by a detector capable of detecting a plurality of a user's designated positions in the screen;
an object moving operation of, in a case where one of the user's designated positions is detected by the detector and the one designated position is included in a determination area that is set based on a position of one object among the plurality of objects, moving the one object in accordance with movement of the one designated position;
a collision determination operation of, in a case where at least one of a first object and a second object is moved at the object moving step, determining whether or not the first object collides against the second object; and
a processing executing operation of executing processing relevant to the first object and the second object based on a result of determination at the collision determination operation,
wherein
the processing executing operation includes
obtaining a first attribute information correlated to the first object and a second attribute information correlated to the second object stored in attribute information storage, which stores attribute information correlated to each of the plurality of objects, in a case where it is determined that the first object and the second object collide with each other, and
displaying on the display a comparison screen for comparing the first attribute information correlated to the first object and the second attribute information correlated to the second object, the comparison screen simultaneously displaying both the first attribute information correlated to the first object and the second attribute information correlated to the second object, wherein both the first attribute information and the second attribute information correspond to a same first attribute, wherein the displayed first attribute information is correlated to the first object but is not correlated to the second object, and the displayed second attribute information is correlated to the second object, but is not correlated to the first object.

3. A non-transitory computer readable information storage medium storing a program for causing a computer to:
  display a screen including a plurality of objects on a display;
  obtain a result of detection by a detector capable of detecting a plurality of a user's designated positions in the screen;
    move, in a case where one of the user's designated positions is detected by the detector and the one designated position is included in a determination area that is set based on a position of one object among the plurality of objects, the one object in accordance with movement of the one designated position;
    determine, in a case where at least one of a first object and a second object is moved, whether or not the first object and the second object collide with each other; and
  execute processing relevant to the first object and the second object based on a result of collision determination,
  wherein
  the processing includes:
    obtaining a first attribute information correlated to the first object and a second attribute information correlated to the second object stored in attribute information storage, which stores attribute information correlated to each of the plurality of objects, in a case where it is determined that the first object and the second object collide with each other, and
    displaying on the display a comparison screen for comparing the first attribute information correlated to the first object and the second attribute information correlated to the second object, the comparison screen simultaneously displaying both the first attribute information correlated to the first object and the second attribute information correlated to the second object, wherein both the first attribute information and the second attribute information correspond to a same first attribute, wherein the displayed first attribute information is correlated to the first object but is not correlated to the second object, and the displayed second attribute information is correlated to the second object, but is not correlated to the first object.

4. The information processing device according to claim 1, wherein in a case where a user's first designated position is included in the determination area set based on the position of the first object, a user's second designated position is included in the determination area set based on the position of the second object, the at least one of the first object and the second object is moved, and the distance between the first designated position and the second designated position is equal to or smaller than a threshold, it is determined that the first object and the second object collide with each other, whereas in a case where the distance is larger than the threshold, even if the first object and the second object contact or overlap with each other, it is determined that the first object and the second object does not collide with each other.

5. The method of claim 2, wherein in a case where a user's first designated position is included in the determination area set based on the position of the first object, a user's second designated position is included in the determination area set based on the position of the second object, the at least one of the first object and the second object is moved, and the distance between the first designated position and the second designated position is equal to or smaller than a threshold, it is determined that the first object and the second object collide with each other, whereas in a case where the distance is larger than the threshold, even if the first object and the second object contact or overlap with each other, it is determined that the first object and the second object does not collide with each other.

6. The non-transitory computer readable medium of claim 3, wherein in a case where a user's first designated position is included in the determination area set based on the position of the first object, a user's second designated position is included in the determination area set based on the position of the second object, the at least one of the first object and the second object is moved, and the distance between the first designated position and the second designated position is equal to or smaller than a threshold, it is determined that the first object and the second object collide with each other, whereas in a case where the distance is larger than the threshold, even if the first object and the second object contact or overlap with each other, it is determined that the first object and the second object does not collide with each other.

7. The information processing device according to claim 1, wherein the first object is an object that corresponds to a first product or a first service, the first attribute information indicates the same first attribute of the first product or the first service, the second object is an object that corresponds to a second product or a second service, and the second attribute information indicates the same first attribute of the second product or the second service.

8. The method of claim 2, wherein the first object is an object that corresponds to a first product or a first service, the first attribute information indicates the same first attribute of the first product or the first service, the second object is an object that corresponds to a second product or a second service, and the second attribute information indicates the same first attribute of the second product or the second service.

9. The non-transitory computer readable medium of claim 3, wherein the first object is an object that corresponds to a first product or a first service, the first attribute information indicates the same first attribute of the first product or the first service, the second object is an object that corresponds to a second product or a second service, and the second attribute information indicates the same first attribute of the second product or the second service.

* * * * *